(12) United States Patent
Sugawara et al.

(10) Patent No.: US 8,278,002 B2
(45) Date of Patent: Oct. 2, 2012

(54) FUEL-CELL AND FUEL CELL SYSTEM INCLUDING THE SAME

(75) Inventors: Yasushi Sugawara, Osaka (JP); Takayuki Urata, Hyogo (JP); Junji Morita, Kyoto (JP); Soichi Shibata, Osaka (JP); Takahiro Umeda, Nara (JP)

(73) Assignee: Panasonic Corporation, Osaka (JP)

( * ) Notice: Subject to any disclaimer, the term of this patent is extended or adjusted under 35 U.S.C. 154(b) by 682 days.

(21) Appl. No.: 12/375,454

(22) PCT Filed: Jul. 30, 2007

(86) PCT No.: PCT/JP2007/064878
§ 371 (c)(1),
(2), (4) Date: Jan. 28, 2009

(87) PCT Pub. No.: WO2008/013303
PCT Pub. Date: Jan. 31, 2008

(65) Prior Publication Data
US 2010/0003568 A1    Jan. 7, 2010

(30) Foreign Application Priority Data

Jul. 28, 2006  (JP) .................................. 2006-205889

(51) Int. Cl.
*H01M 8/10* (2006.01)
*H01M 8/04* (2006.01)
(52) U.S. Cl. ........................ 429/481; 429/430
(58) Field of Classification Search .................. 429/430;
H01M 8/00, 8/02, 8/04, 8/06, 8/10
See application file for complete search history.

(56) References Cited

U.S. PATENT DOCUMENTS

| | | | |
|---|---|---|---|
| 2005/0255369 A1* | 11/2005 | Morse et al. | 429/38 |
| 2006/0014070 A1* | 1/2006 | Kaye et al. | 429/34 |

FOREIGN PATENT DOCUMENTS

| | | | | |
|---|---|---|---|---|
| JP | 02-135669 | | 5/1990 | |
| JP | 11-204117 | | 7/1999 | |
| JP | 11204117 A | * | 7/1999 | |
| JP | 2000-285934 | | 10/2000 | |
| JP | 2000285934 A | * | 10/2000 | |
| JP | 2001-325980 | | 11/2001 | |
| JP | 2007-042406 | | 2/2007 | |
| JP | 2007-115512 | | 5/2007 | |

\* cited by examiner

*Primary Examiner* — Ula C Ruddock
*Assistant Examiner* — Daniel Gatewood
(74) *Attorney, Agent, or Firm* — McDermott Will & Emery LLP

(57) ABSTRACT

A fuel cell includes: cells (11), each of which includes an electrolyte layer-electrode stack assembly (5) having a electrolyte layer (1) and a pair of gas diffusion electrodes (4a, 4b) sandwiching a portion of the electrolyte layer (1) which portion is located on an inner side of a peripheral portion of the electrolyte layer (1), an annular peripheral member disposed at the peripheral portion of the electrolyte layer (1), a pair of electrically conductive separators (6A, 6B) which sandwich the electrolyte layer-electrode stack assembly (5) and the peripheral member, and damage detecting wires (31); and a fuel cell stack (100) formed by stacking the cells (11), wherein: the damage detecting wires (31) are formed on components constituting the cell (11) other than the electrolyte layer-electrode stack assembly (5); and the damage detecting wires (31) are connected to one another to form an open circuit by stacking the cells (11).

14 Claims, 17 Drawing Sheets

FUEL-CELL AND FUEL CELL SYSTEM INCLUDING THE SAME

RELATED APPLICATIONS

This application is the U.S. National Phase under 35 U.S.C. §371 of International Application No. PCT/JP2007/064878, filed on Jul. 30, 2007, which in turn claims the benefit of Japanese Application No. 2006-205889, filed on Jul. 28, 2006, the disclosures of which Applications are incorporated by reference herein.

TECHNICAL FIELD

The present invention relates to a fuel cell and a fuel cell system including the fuel cell, and particularly to a configuration of the fuel cell.

BACKGROUND ART

A fuel cell cause a hydrogen-containing fuel gas, which is obtained by reforming a material gas, such as a city gas, and an oxidizing gas, such as air, containing oxygen to electrochemically react with each other, thereby generating electric power and heat at the same time. A unit cell (cell) of the fuel cell includes: an electrolyte layer-electrode stack assembly constituted by a electrolyte layer and a pair of gas diffusion electrodes; gaskets; and electrically conductive separators. A groove-like gas channel through which the fuel gas or the oxidizing gas (each of which is called a reactant gas) flows is formed on a main surface of each separator which surface contacts the gas diffusion electrode. The gaskets are disposed on peripheral portions of the electrolyte layer-electrode stack assembly, and a pair of these separators sandwich the electrolyte layer-electrode stack assembly. Thus, one cell is formed. A common fuel cell is so-called a stack-type fuel cell in which the above-described cells are stacked and fastened to one another, and adjacent electrolyte layer-electrode stack assemblies are electrically connected to each other in series.

The stack-type fuel cell has manifolds through each of which the reactant gas supplied to the fuel cell is supplied to the gas channel of each cell. Each manifold is formed by connecting, one another in a stack direction of the cells, manifold holes each of which is formed on the separator and extend in a thickness direction of the separator.

The fuel cell generates heat during its operation. Therefore, in order to maintain the cell at a proper temperature, the fuel cell needs to be cooled down by, for example, cooling water. Typically, a groove-like cooling water channel through which the cooling water flows is formed per 1 to 3 cells on a main surface of the separator which is opposite to the main surface on which the gas channel is formed. Moreover, the fuel cell has a manifold through which the cooling water is supplied to the cooling water channel. Such manifold formed inside the fuel cell is referred to as an inner manifold. In the fuel cell of such inner manifold type, in light of reduction in size and cost, it is important to efficiently arrange respective component (gas channel, manifold hole, and the like) on the same surface of the separator.

However, in a case where the components are efficiently arranged, the ratio of empty spaces in the separator becomes high, and this decreases the strength of the separator. Therefore, the separator, especially the peripheral portion of each manifold of the separator, tends to be damaged. Moreover, in a case where the separator is damaged, the fuel cell cannot operate. Therefore, it is necessary to quickly detect the damage of the separator in the fuel cell stack and repair it.

Known as a fuel cell which can solve these problems is a solid polymer electrolyte fuel cell which detects the damage of the fuel cell stack by supplying an indicator gas to the fuel cell (fuel cell stack) together with the reactant gas and measuring the concentration of the indicator gas in the reactant gas discharged from the fuel cell (see Patent Document 1 for example).

Patent Document 1: Japanese Laid-Open Patent Application Publication 2001-325980

DISCLOSURE OF THE INVENTION

Problems to be Solved by the Invention

However, in the solid polymer electrolyte fuel cell disclosed in Patent Document 1, since the concentration of the discharged indicator gas is measured, it takes time to detect the damage. In addition, the damage cannot be detected while the fuel cell is not operating. Further, in a case where the damage of the fuel cell stack is minor, it is difficult to detect such damage. Thus, there is still room for improvement.

The present invention was made in light of the above problems, and an object of the present invention is to provide a fuel cell and a fuel cell system, each of which can quickly and surely detect the even minor damage of the fuel cell stack, and can detect the damage at all times with a simple configuration even while the fuel cell is not operating.

Means for Solving the Problems

To solve the above conventional problems, a fuel cell of the present invention includes: cells, each of which includes an electrolyte layer-electrode stack assembly having a electrolyte layer and a pair of gas diffusion electrodes sandwiching a portion of the electrolyte layer which portion is located on an inner side of a peripheral portion of the electrolyte layer, an annular peripheral member disposed at the peripheral portion of the electrolyte layer, a pair of electrically conductive plate-shaped separators which sandwich the electrolyte layer-electrode stack assembly and the peripheral member and each of which has a main surface contacting the gas diffusion electrode and having a groove-like gas channel through which a reactant gas flows, and damage detecting wires; and a fuel cell stack formed by stacking the cells, wherein: the damage detecting wires are formed at components constituting the cell other than the electrolyte layer-electrode stack assembly; and the damage detecting wires are connected to one another the cells to form an open circuit by stacking.

With this, when the outer peripheral portion of the fuel cell stack is damaged, this changes a resistance value of current flowing through the damage detecting wire. Therefore, by detecting the change in the resistance value, it is possible to detect the damage of the fuel cell stack without providing an excessive additional device.

In the fuel cell of the present invention, the damage detecting wire may be formed to extend in a surface direction of the separator.

In the fuel cell of the present invention, the damage detecting wire may be formed to extend along an outer peripheral portion of the separator without short-circuiting.

With this, the minor damage can be detected quickly.

In the fuel cell of the present invention, the damage detecting wire may be formed to serpentine on an entire surface of the separator.

In the fuel cell of the present invention, the damage detecting wire may be formed at a peripheral portion of the main surface of the separator which surface contacts the electrolyte layer-electrode stack assembly.

In the fuel cell of the present invention, the damage detecting wire may be formed to be flush with the main surface of the separator.

In the fuel cell of the present invention, the damage detecting wire may be formed on a side surface of the separator.

In the fuel cell of the present invention, the damage detecting wire may be formed inside the separator.

In the fuel cell of the present invention, the peripheral member may include an annular frame member which surrounds the electrolyte layer so as to sandwich a peripheral portion of the electrolyte layer, and a sealing member, and the damage detecting wire may be formed to extend along the frame member.

In the fuel cell of the present invention, the damage detecting wire may be formed to extend along an outer peripheral portion of the frame member without short-circuiting.

In the fuel cell of the present invention, the damage detecting wire may be formed inside the frame member.

In the fuel cell of the present invention, the damage detecting wire may be formed by printing.

In the fuel cell of the present invention, the damage detecting wires may be divided into a plurality of groups in a stack direction of the cells and be connected to one another for each group to form a plurality of the open circuits.

With this, it is possible to easily specify a damaged portion of the fuel cell stack.

In the fuel cell of the present invention, the damage detecting wires may be formed at the components constituting the cell other than the electrolyte layer-electrode stack assembly and be formed at a plurality of predetermined portions of the cell, and the damage detecting wires formed at the corresponding portions of the cells may be connected to one another to form a plurality of the open circuits.

With this, it is possible to easily specify the damaged portion of the fuel cell stack.

Moreover, a fuel cell system of the present invention includes: the fuel cell; a damage detector configured to detect an increase in resistance of the damage detecting wire; and a control device, wherein the control device detects a damage of the separator of the fuel cell stack based on the increase in the resistance of the damage detecting wire which is detected by the damage detector.

With this, when the outer peripheral portion of the fuel cell stack is damaged, this changes the resistance of the current flowing through the damage detecting wire. Therefore, by detecting the change in the resistance, it is possible to detect the damage of the fuel cell stack without providing an excessive additional device.

Effects of the Invention

In accordance with the fuel cell of the present invention and the fuel cell system including the fuel cell, the damage of the fuel cell stack can be detected even if the damage is minor, and the damage of the fuel cell stack can be detected at all times with a simple configuration even while the fuel cell is not operating.

Figure 1:
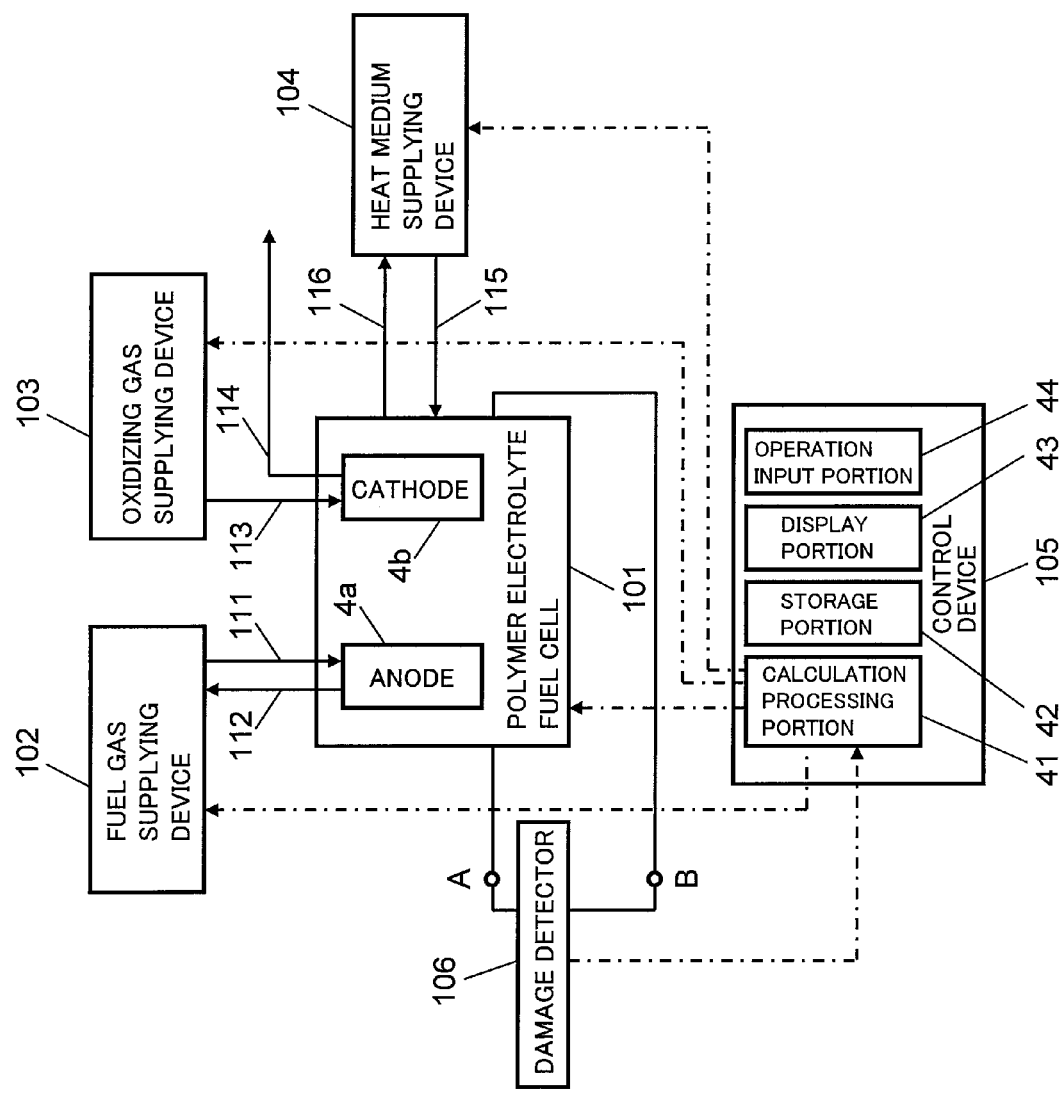
FIG. 1 is a block diagram schematically showing the configuration of a fuel cell system according to Embodiment 1.

EXPLANATION OF REFERENCE NUMBERS 1 polymer electrolyte membrane
2a anode catalyst layer
2b cathode catalyst layer
3a anode gas diffusion layer
3b cathode gas diffusion layer
4a anode
4b cathode
5 MEA
6A anode separator
6B cathode separator
7 anode gas channel
8 cathode gas channel
9 heat medium channel
10 gasket
11 cell
21a fuel gas supply manifold hole
21b fuel gas supply manifold hole
21c fuel gas supply manifold hole
22a fuel gas discharge manifold hole
22b fuel gas discharge manifold hole
22c fuel gas discharge manifold hole
23a oxidizing gas supply manifold hole
23b oxidizing gas supply manifold hole
23c oxidizing gas supply manifold hole
24a oxidizing gas discharge manifold hole 24b oxidizing gas discharge manifold hole
24c oxidizing gas discharge manifold hole
25a heat medium supply manifold hole
25b heat medium supply manifold hole
25c heat medium supply manifold hole
26a heat medium discharge manifold hole
26b heat medium discharge manifold hole
26c heat medium discharge manifold hole
31 damage detecting wire
31a routing portion
31b first connection portion
31c second connection portion
41 calculation processing portion
42 storage portion
43 display portion
44 operation input portion
50 cell stack body
60A plate member
60B plate member
61 damage detection power supply
62 reference power supply
63 output signal power supply
65 comparator
71 groove
72 electrically conductive wire
73 insulator
81 terminal end portion
101 polymer electrolyte fuel cell (PEFC)
102 fuel gas supplying device
103 oxidizing gas supplying device
104 heat medium supplying device
105 control device
106 damage detector
111 fuel gas supplying passage
112 fuel gas discharging passage
113 oxidizing gas supplying passage
114 oxidizing gas discharging passage
115 heat medium supplying passage
116 heat medium discharging passage
121 fuel gas supply manifold
122 fuel gas discharge manifold
123 oxidizing gas supply manifold
124 oxidizing gas discharge manifold
125 heat medium supply manifold
126 heat medium discharge manifold
A terminal
B terminal
R1 resistor
R2 resistor
S1 space
S2 space

BEST MODE FOR CARRYING OUT THE INVENTION

Hereinafter, preferred embodiments of the present invention will be explained in reference to the drawings.

Embodiment 1

FIG. 1 is a block diagram schematically showing the configuration of a fuel cell system according to Embodiment 1 of the present invention.

First, the configuration of the fuel cell system according to Embodiment 1 will be explained.

As shown in FIG. 1, the fuel cell system according to Embodiment 1 includes a polymer electrolyte fuel cell (hereinafter referred to as "PEFC") 101, a fuel gas supplying device 102, an oxidizing gas supplying device 103, a heat medium supplying device 104, a control device 105, and a damage detector 106.

The PEFC 101 is connected to the fuel gas supplying device 102 by a fuel gas supplying passage 111. The fuel gas supplying device 102 supplies a fuel gas to an anode 4a of the PEFC 101 through the fuel gas supplying passage 105. Herein, the fuel gas supplying device 102 includes: a plunger pump (not shown) which feeds a natural gas (material gas), supplied from a natural gas supply infrastructure, to a fuel processor (not shown); a flow rate adjuster (not shown) capable of adjusting a feed amount of the natural gas; and the fuel processor which reforms the fed natural gas into a hydrogen-rich fuel gas. In the fuel processor, a reforming reaction between the natural gas and steam is carried out to generate a reformed gas, and CO contained in the reformed gas is reduced to about 1 ppm, thereby generating a fuel gas. Moreover, the PEFC 101 is connected to the fuel processor (to be precise, a heater portion of the fuel processor) of the fuel gas supplying device 102 by a fuel gas discharging passage 112.

Moreover, the PEFC 101 is connected to the oxidizing gas supplying device 103 by an oxidizing gas supplying passage 113. The oxidizing gas supplying device 103 supplies an oxidizing gas to a cathode 4b of the PEFC 101 through the oxidizing gas supplying passage 113. Herein, the oxidizing gas supplying device 103 is constituted by a blower (not shown) whose inlet port is open to the atmosphere. Moreover, the PEFC 101 is connected to an oxidizing gas discharging passage 114 to discharge an unreacted oxidizing gas to the outside of the system.

Further, the PEFC 101 is connected to the heat medium supplying device 104 by a heat medium supplying passage 115 and a heat medium discharging passage 116. To maintain the inside of the cell at an appropriate temperature, the heat medium supplying device 104 is configured to supply the heat medium to the PEFC 101, and cool down or heat the heat medium discharged from the PEFC 101. Herein, used as the heat medium is water.

In the PEFC 101, the fuel gas containing hydrogen supplied from the fuel gas supplying device 102 and the oxidizing gas containing oxygen supplied from the oxidizing gas supplying device 103 electrochemically react with each other to generate water and electric power. At this time, the unreacted fuel gas is supplied as an off gas to the fuel processor of the fuel gas supplying device 102 through the fuel gas discharging passage 112.

Figure 2:
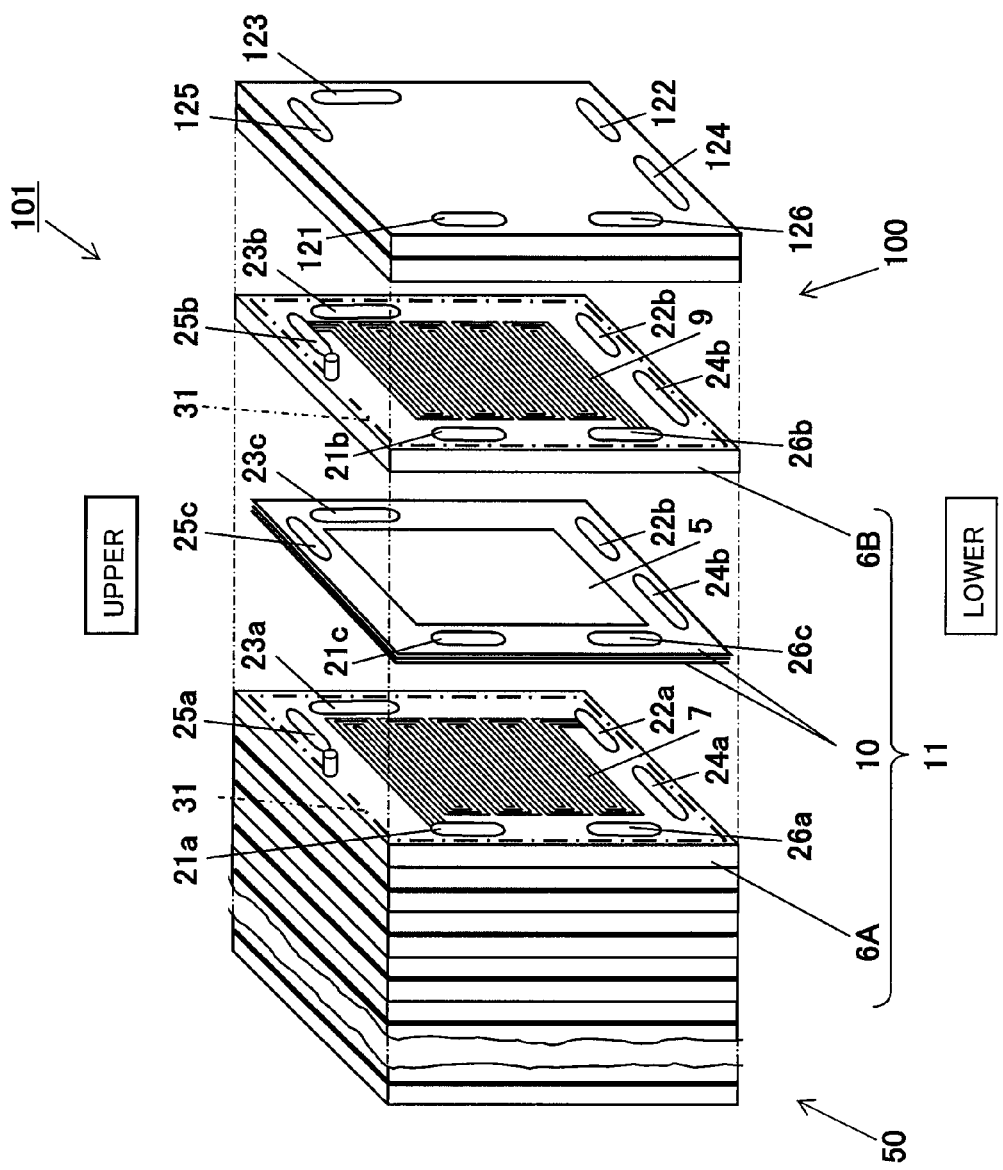
FIG. 2 is a developed view schematically showing a polymer electrolyte fuel cell shown in FIG. 1.

Moreover, in the PEFC 101, a damage detecting wire 31 is formed (see FIG. 2). One end of the damage detecting wire 31 is connected to an the external connection terminal A of the damage detector 106, and the other end of the damage detecting wire 31 is connected to an the external connection terminal B of the damage detector 106. The damage detector 106 detects, at all times, electrical conduction of an open circuit formed in the PEFC 101, and inputs electrical conduction information to the control device 105.

The control device 105 is constituted by a computer, such as a microcomputer, and includes a calculation processing portion 41, such as a CPU, a storage portion 42, such as a memory, a display portion 43, such as a monitor, and an operation input portion 44, such as a keyboard. The calculation processing portion 41 reads out and execute a predetermined control program stored in the storage portion 42, thereby carrying out various control of the fuel cell system. Moreover, the calculation processing portion 41 processes data stored in the storage portion 42 and data input from the operation input portion 44. Especially, the calculation processing portion 41 detects the damage of a fuel cell stack constituting the PEFC 101 based on a result of the detection of the electrical conduction of the open circuit formed in the PEFC 101 which result is input from the damage detector 106. The detection of the damage of the fuel cell stack will be described later.

In the present specification, the control device denotes not only a single control device but also a group of control devices which execute the control of the fuel cell system in cooperation with one another. Therefore, the control device does not have to be constituted by a single control device. The control device may be constituted by a plurality of control devices distributed, and may be configured such that these control devices control the operation of the fuel cell system in cooperation with one another.

Next, the configuration of the PEFC 101 of the fuel cell system according to Embodiment 1 will be explained.

FIG. 2 is a developed view schematically showing the PEFC 101 shown in FIG. 1.

As shown in FIG. 2, the PEFC 101 is constituted by a fuel cell stack 100 including: a cell stack body 50 formed by stacking cells 11, each of whose entire shape is a plate shape, in a thickness direction of the cell 11; end plates (not shown) which are disposed on both ends, respectively, of the cell stack body 50; and fastening members (not shown) which fasten the cell stack body 50 and the end plates in a stack direction of the cells 11. Moreover, a current collector and an insulating plate are disposed on the end plate but are not shown, and an external connecting terminal of the damage detecting wire which forms the open circuit is not shown, either.

Moreover, the cell 11 includes a MEA (Membrane-Electrode-Assembly; electrolyte layer-electrode stack assembly) 5, gaskets (sealing members) 10, an anode separator 6A, and a cathode separator 6B.

Here, the configuration of the cell 11 will be explained in reference to FIGS. 2 and 3.

Figure 3:
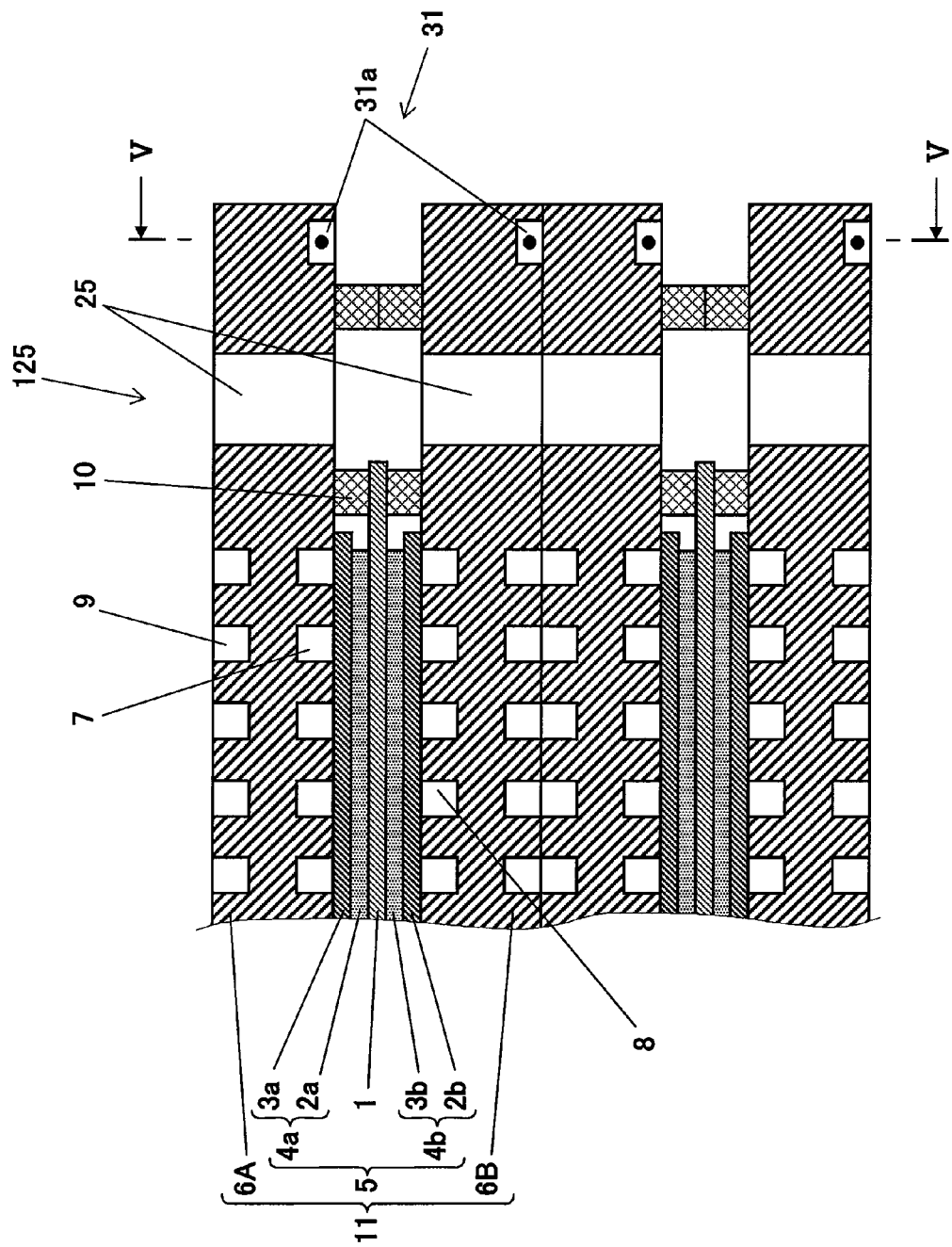
FIG. 3 is a cross-sectional view showing a schematic configuration of a cell constituting the polymer electrolyte fuel cell shown in FIG. 2.

FIG. 3 is a cross-sectional view showing a schematic configuration of the cell 11 constituting the PEFC 101 shown in FIG. 2. In FIG. 3, a part of the cell 11 is omitted.

As shown in FIG. 3, the MEA 5 includes: a polymer electrolyte membrane (electrolyte layer) 1 which selectively transports hydrogen ions; the anode 4a; and the cathode 4b. The anode 4a and the cathode 4b (which are referred to as "gas diffusion electrodes") are disposed to be located at inner regions, respectively, of both surfaces of the polymer electrolyte membrane 1 which regions are located on an inner side of a peripheral portion of the polymer electrolyte membrane 1. The anode 4a includes: an anode catalyst layer 2a which is disposed on one main surface of the polymer electrolyte membrane 1 and contains, as a major component, carbon powder carrying platinum-based metal catalyst; and an anode gas diffusion layer 3a which is disposed on the anode catalyst layer 2a and has both gas permeability and electrical conductivity. Similarly, the cathode 4b includes: a cathode catalyst layer 2b which is disposed on another main surface of the polymer electrolyte membrane 1 and contains, as a major component, carbon powder carrying platinum-based metal catalyst; and a cathode gas diffusion layer 3b which is disposed on the cathode catalyst layer 2b and has both gas permeability and electrical conductivity.

A pair of the gaskets 10 made of fluorocarbon rubber are disposed around the anode 4a and the cathode 4b, respectively, so as to sandwich the polymer electrolyte membrane 1. With this, the fuel gas, the air, and the oxidizing gas are prevented from leaking to the outside of the cell and prevented from being mixed with one another in the cell 11.

As shown in FIG. 2, herein, the gasket 10 has a substantially rectangular ring shape. Formed on a peripheral portion of a main surface of the gasket 10 are a fuel gas supply manifold hole 21c, an oxidizing gas supply manifold hole 23c, a heat medium supply manifold hole 25c, a fuel gas discharge manifold hole 22c, an oxidizing gas discharge manifold hole 24c, and a heat medium discharge manifold hole 26c, which are through holes extending in a thickness direction of the gasket 10. Herein, the gasket 10 is a peripheral member recited in claims of the present application.

The anode separator 6A and the cathode separator 6B both having electrical conductivity are disposed to sandwich the MEA 5 and the gaskets 10. Used as each of the separators 6A and 6B is a resin-impregnated graphite plate which is formed by impregnating a graphite plate with phenol resin and hardening the graphite plate. Moreover, the separators 6A and 6B may be made of a metallic material, such as SUS. By the anode separator 6A and the cathode separator 6B, the MEA 5 is mechanically fixed, and adjacent MEAs 5 are electrically connected to each other in series.

Formed on a peripheral portion of the anode separator 6A are a fuel gas supply manifold hole 21a, an oxidizing gas supply manifold hole 23a, a heat medium supply manifold hole 25a, a fuel gas discharge manifold hole 22a, an oxidizing gas discharge manifold hole 24a, and a heat medium discharge manifold hole 26a, which are through holes extending in a thickness direction of the anode separator 6A.

Moreover, a groove-like anode gas channel 7 through which the fuel gas flows is formed in a serpentine shape on an inner surface (surface contacting the MEA 5) of the anode separator 6A so as to connect the fuel gas supply manifold hole 21a and the fuel gas discharge manifold hole 22a. In addition, a groove-like heat medium channel 9 through which the heat medium flows is formed in a serpentine shape on an outer surface of the anode separator 6A (see FIG. 4(b)).

As with the anode separator 6A, formed on a peripheral portion of the cathode separator 6B are a fuel gas supply manifold hole 21b, an oxidizing gas supply manifold hole 23b, a heat medium supply manifold hole 25b, a fuel gas discharge manifold hole 22b, an oxidizing gas discharge manifold hole 24b, and a heat medium discharge manifold hole 26b, which are through holes extending in a thickness direction of the cathode separator 6B.

Moreover, a groove-like cathode gas channel 8 through which the oxidizing gas flows is formed in a serpentine shape on an inner surface of the cathode separator 6B (see FIG. 3), and the groove-like heat medium channel 9 through which the heat medium flows is formed in a serpentine shape on an outer surface of the cathode separator 6B so as to connect the heat medium supply manifold hole 25b and the heat medium discharge manifold hole 26b.

The cell stack body 50 is formed by stacking the cells 11, configured as above, in a thickness direction of the cell 11. Moreover, the fuel gas supply manifold holes 21a, 21b, and 21c formed on the anode separator 6A, the cathode separator 6B, and the gasket 10 are connected to one another in the thickness direction by stacking the cells 11 to form a fuel gas supply manifold 121, and the fuel gas discharge manifold holes 22a, 22b, and 22c formed on the anode separator 6A, the cathode separator 6B, and gasket 10 are connected to one another in the thickness direction by stacking the cells 11 to form a fuel gas discharge manifold 122. Similarly, the oxidizing gas supply manifold holes 23a, 23b, and 23c are connected to one another in the thickness direction to form an oxidizing gas supply manifold 123, and the oxidizing gas discharge manifold holes 24a, 24b, and 24c are connected to one another in the thickness direction to form an oxidizing gas discharge manifold 124. Moreover, the heat medium supply manifold holes 25a, 25b, and 25c are connected to one another in the thickness direction to form a heat medium supply manifold 125, and the heat medium discharge manifold holes 26a, 26b, and 26c are connected to one another in the thickness direction to form a heat medium discharge manifold 126. A suitable pipe (not shown in FIG. 2) is connected to each of these manifolds.

The heat medium channel 9 formed on the outer surface of the separator 6A and the heat medium channel 9 formed on the outer surface of the separator 6B are coupled to each other by stacking the cells 11, thereby forming one heat medium channel. Moreover, to prevent the heat medium from leaking to the fuel gas supply manifold holes 21 and the like, a sealing member, such as an O ring, is disposed on the outer surface of each of the separators 6A and 6B. With this, the heat medium channel and the like are sealed.

Next, the configuration of the open circuit disposed in the PEFC 101 of the fuel cell system according to Embodiment 1 will be explained in reference to FIGS. 2 to 5.

Figure 4:
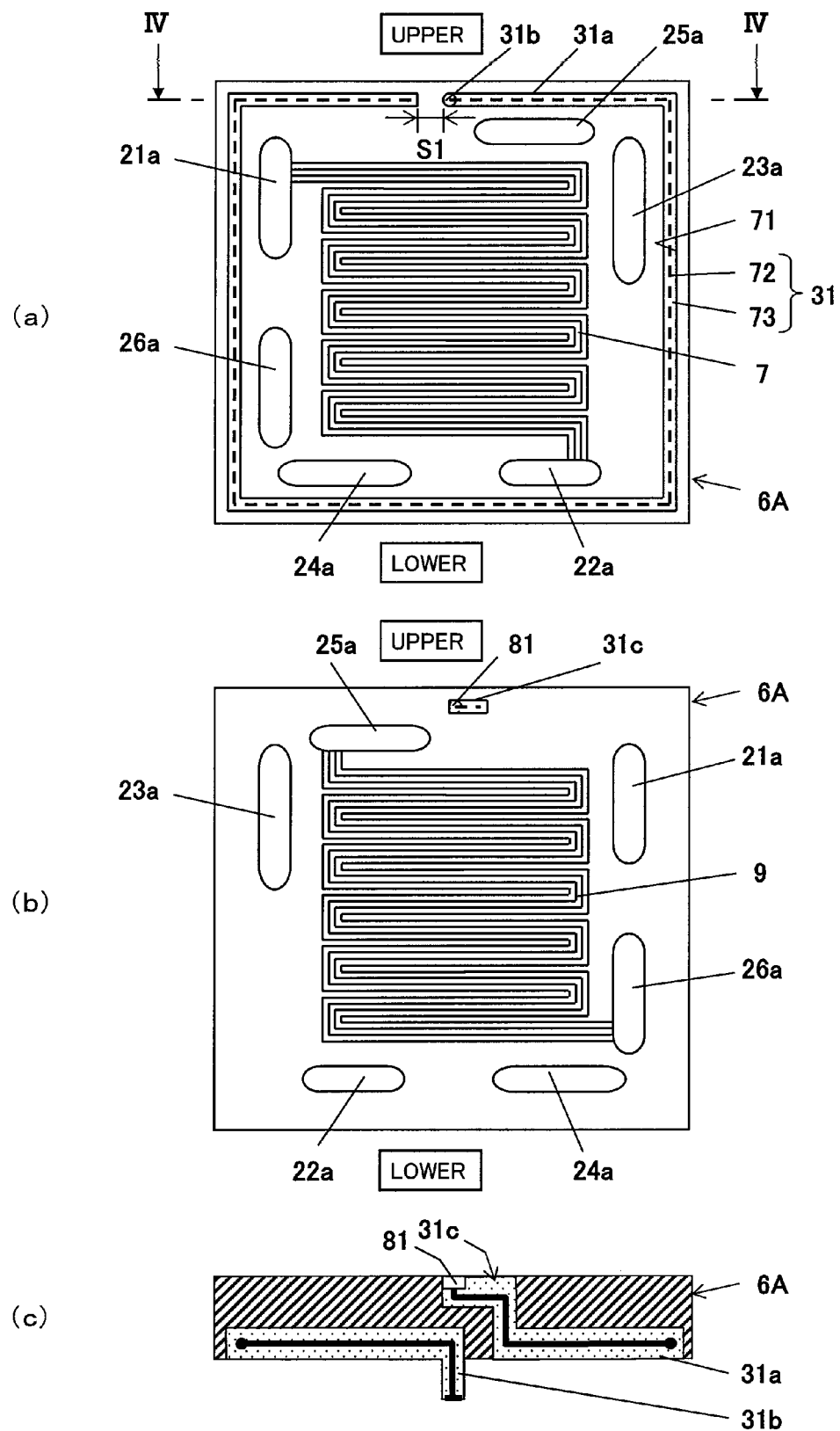
FIG. 4 are schematic diagrams each showing the configuration of an anode separator of the cell shown in FIG. 2.
Figure 5:
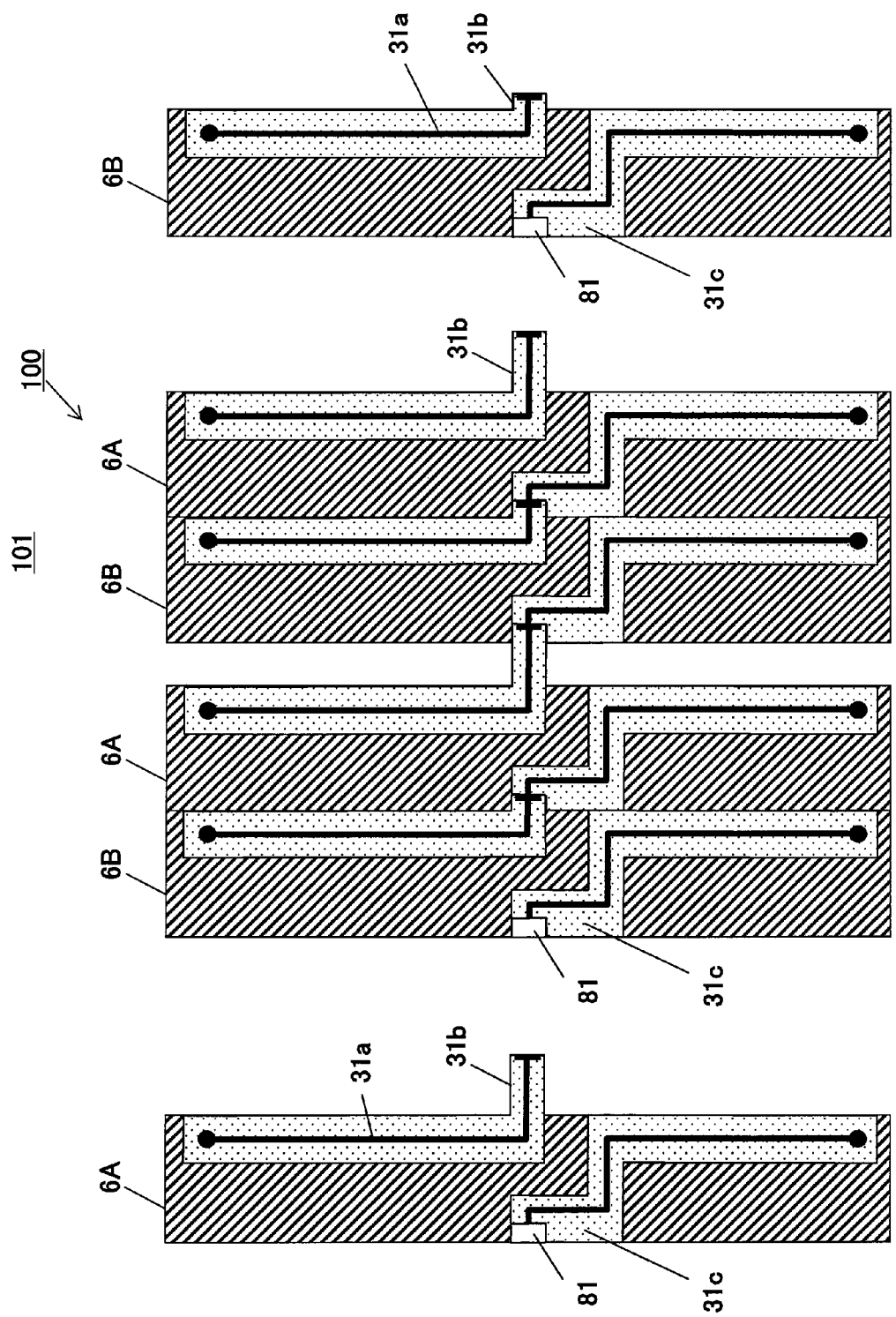
FIG. 5 is a cross-sectional view showing a cross section taken along line V-V of FIG. 2.

FIG. 4 are schematic diagrams each showing the configuration of the anode separator 6A of the cell 11 shown in FIG. 2. FIG. 4(a) is a schematic diagram showing the configuration of the inner surface of the anode separator 6A. FIG. 4(b) is a schematic diagram showing the configuration of the outer surface of the anode separator 6A. FIG. 4(c) is a cross-sectional view showing a cross section taken along line IV-IV of FIG. 4(a). FIG. 5 is a cross-sectional view showing a cross section taken along line V-V of FIG. 3, but a part of the cross section is omitted. Note that a vertical direction in each of FIGS. 4(a) and 4(b) is defined as shown in the drawing.

As shown in FIGS. 4(a) to 4(c), the damage detecting wire 31 including a routing portion 31a, a first connection portion 31b, and a second connection portion 31c is formed on the anode separator 6A.

As shown in FIG. 4(a), the routing portion 31a of the damage detecting wire 31 is disposed on the inner surface of the anode separator 6A so as to extend along the peripheral portion (outer peripheral portion) of the anode separator 6A substantially once, and surrounds respective manifold holes. Herein, the routing portion 31a is routed counterclockwise in a front view such that a space S1 is formed at a substantially center of an upper edge portion on the inner surface of the anode separator 6A. The first connection portion 31b is disposed at a portion (hereinafter referred to as "start end portion") of the routing portion 31a which portion is located on one side of the space S1, and the second connection portion 31c is disposed at a portion (hereinafter referred to as "terminal end portion") of the routing portion 31a which portion is located on the other side of the space S1. In the present embodiment, the routing portion 31a of the damage detecting wire 31 is disposed between an outer periphery of the anode separator 6A and each manifold hole in a front view. However, the present embodiment is not limited to this. A part of the routing portion 31a may be disposed between each manifold hole and the anode gas channel 7. To be specific, the outer peripheral portion of the anode separator 6A is a region between the outer periphery of the anode separator 6A and the anode gas channel 7 in a front view.

Moreover, as shown in FIGS. 4(b) and 4(c), the second connection portion 31c is formed to extend from the terminal end portion of the routing portion 31a up to the outer surface of the anode separator 6A in the thickness direction, and further extend in a horizontal direction therefrom. A terminal end portion 81 of the second connection portion 31c is formed to coincide with (overlap with) the first connection portion 31b when viewed from the thickness direction of the anode separator 6A.

As shown in FIG. 4(c), the first connection portion 31b projects in the thickness direction, and the second connection portion 31c is concave in the thickness direction. The first connection portion 31b of the anode separator 6A is formed to fit in the terminal end portion 81 of the second connection portion 31c of the below-described cathode separator 6B, and the terminal end portion 81 of the second connection portion 31c of the anode separator 6A is formed to fit to the first connection portion 31b of the below-described cathode separator 6B. Herein, the first connection portion 31b is formed at an upper portion of the anode separator 6A. However, the present embodiment is not limited to this. The first connection portion 31b may be formed anywhere as long as it coincides with the terminal end portion 81 of the second connection portion 31c when viewed from the thickness direction of the anode separator 6A, and is disposed at the peripheral portion of the anode separator 6A.

Herein, the damage detecting wire 31 is constituted by an electrically conductive wire 72 and an insulator 73 which covers the electrically conductive wire 72. Specifically, the first connection portion 31b is formed such that the electrically conductive wire 72 extends through a center portion of the insulator 73 having a column shape. Moreover, the routing portion 31a is formed such that the electrically conductive wire 72 covered with the insulator 73 is embedded in a groove 71 formed on the inner surface of the anode separator 6A. The second connection portion 31c is formed such that the electrically conductive wire 72 covered with the insulator 73 is embedded in the groove and through hole formed on the anode separator 6A.

An electrically nonconductive material of the insulator 73 constituting the damage detecting wire 31 needs to be capable of electrically insulating the damage detecting wire 31 from the fuel cell stack 100 and has high chemical durability. Therefore, examples of such electrically nonconductive material are fluorocarbon rubber, polyisoprene, butyl rubber, ethylene propylene rubber, silicone rubber, nitrile rubber, thermoplastic elastomer, liquid crystal polymer, polyimide resin, polyether ether ketone resin, polyether imide resin, polyphenylene sulfide resin, terephthalamide resin, polyethersulfone resin, polysulfone resin, disyndiotactic polystyrene resin, polymethylpentene resin, modified polyphenylene ether resin, polyacetal resin, polypropylene resin, fluorocarbon resin, polyethylene terephthalate resin, and a composite containing a plurality of these materials. Moreover, examples of an electrically conductive material of the electrically conductive wire 72 constituting the damage detecting wire 31 are metallic foil, Ag paste, and carbon paste. Further, since the damage detecting wire 31 breaks when the fuel cell stack 100 is damaged, these electrically conductive material and electrically nonconductive material are preferably low in flexibility. In addition, it is preferable that the damage detecting wire 31 be formed thinly.

As with the anode separator 6A, the damage detecting wire 31 is also disposed on the cathode separator 6B. However, the cathode separator 6B is different from the anode separator 6A in that: the routing portion 31a is formed on the outer surface (main surface on which the heat medium channel 9 is formed) of the cathode separator 6B; the first connection portion 31b is formed at the terminal end portion of the routing portion 31a; and the terminal end portion 81 of the second connection portion 31c is formed on the inner surface of the cathode separator 6B (see FIGS. 2 and 5).

The height of the first connection portion 31b of the anode separator 6A in the thickness direction is set to be the same as the depth of the terminal end portion 81 of the second connection portion 31c of the cathode separator 6B in the thickness direction in a state where the fuel cell stack 100 is fastened. Moreover, the height of the first connection portion 31b formed on the cathode separator 6B in the thickness direction is set to be the same as the sum of the height of the gaskets 10 or the MEA 5 in the thickness direction and the depth of the terminal end portion 81 of the second connection portion 31c of the anode separator 6A in the thickness direction in the state where the fuel cell stack 100 is fastened.

With this, as shown in FIG. 5, in the state where the fuel cell stack 100 is fastened, the first connection portion 31b of the anode separator 6A fits in the terminal end portion 81 of the second connection portion 31c of the cathode separator 6B, and the first connection portion 31b of the cathode separator 6B fits in the terminal end portion 81 of the second connection portion 31c of the anode separator 6A. Thus, the damage detecting wire 31 formed on the separator 6A and the damage detecting wire 31 formed on the separator 6B are connected to each another. As a result, one coil-like open circuit is formed in the entire fuel cell.

As above, each damage detecting wire 31 is formed to surround the manifold holes of each of the separators 6A and 6B and is formed such that the first connection portion 31b and the second connection portion 31c are connected to both ends, respectively, of the routing portion 31a which is disposed to extend along the substantially entire peripheral portion of the main surface of each of the separators 6A and 6B. The entire damage detecting wire 31 is formed to extend along the outer peripheral portions of the separators 6A and 6B (herein, once) without short-circuiting. As described above, the outer peripheral portion of the fuel cell stack 100 which portion is exposed to the outside is easily damaged. However, in the present embodiment, the damage detecting wire 31 is disposed to extend along such outer peripheral portion for each of the separators 6A and 6B.

Therefore, in a case where the separator is damaged, especially, the peripheral portion of the separator is damaged (for example, in a case where a portion between the outer periphery of the separator and the manifold hole cracks), the damage detecting wire 31 also breaks. The damage detecting wire 31 is insulated from each of the separators 6A and 6B, and the open circuit is not formed in the separator. Therefore, in a case where the damage detecting wire 31 breaks due to the damage of the separator, current does not flow in the open circuit formed in the entire fuel cell. On this account, the damage of the fuel cell stack 100 can be detected by detecting the electric conduction information of the damage detecting wire 31.

In the present embodiment, the damage detecting wire 31 is configured to extend along the outer peripheral portions of the separators 6A and 6B without short-circuiting, and to extend along the outer peripheral portion of each separator once. However, the present embodiment is not limited to this. The damage detecting wire 31 may be configured to extend along the outer peripheral portion of each separator several times, or the damage detecting wire 31 may be configured not to completely extend along the outer periphery of each separator once.

Moreover, the routing portion 31a disposed on the main surface of each of the separators 6A and 6B are formed to be routed counterclockwise when viewed from the thickness direction of the separator. However, the present embodiment is not limited to this. The routing portion 31a disposed on the main surface of each of the separators 6A and 6B may be formed to be routed clockwise. Further, the routing portion 31a may be formed to be routed clockwise on the main surface of one of the separators and counterclockwise on the main surface of the other separator.

Next, the configuration of the damage detector 106 of the fuel cell system according to Embodiment 1 will be explained.

Figure 6:
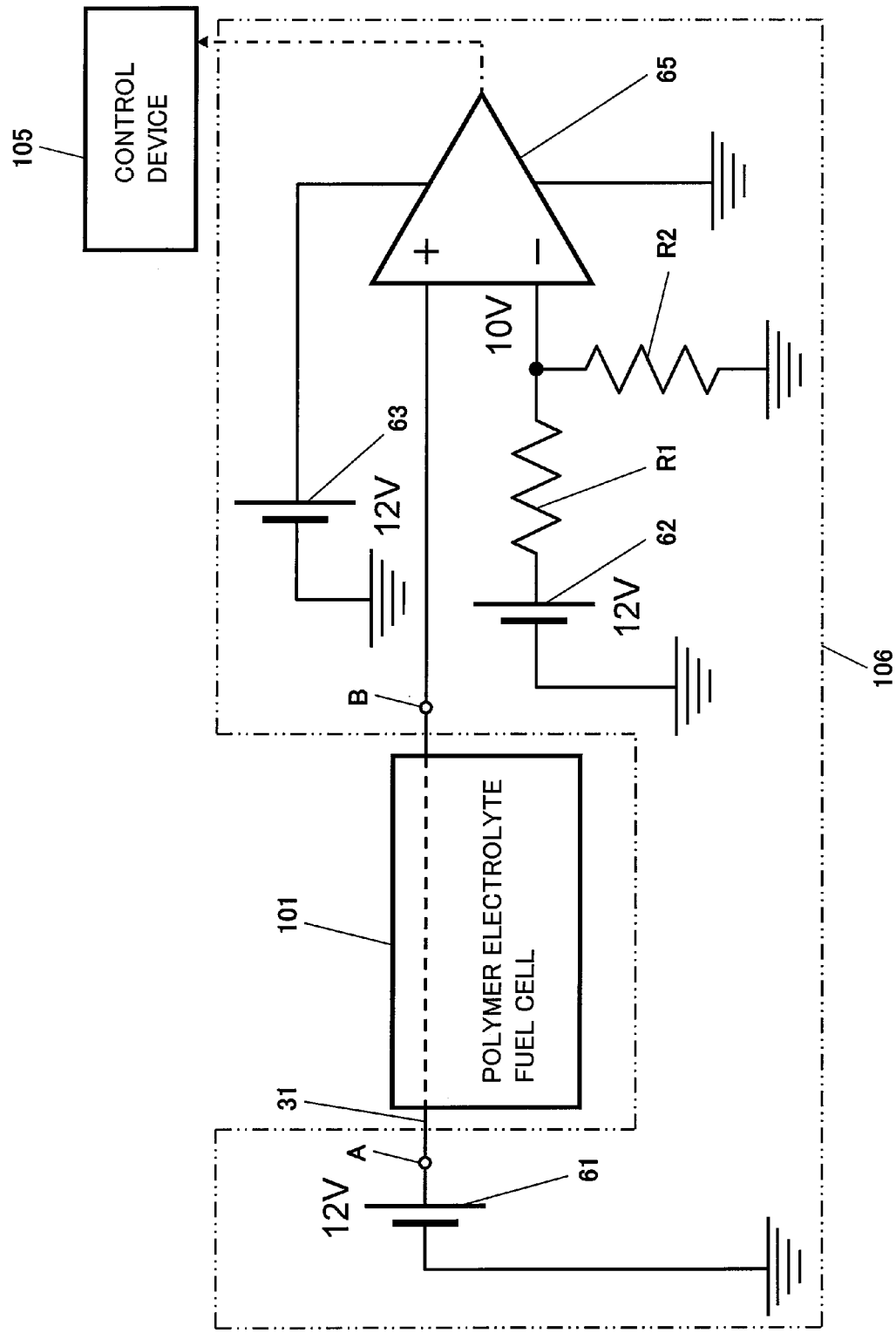
FIG. 6 is a schematic diagram showing a wire break detecting circuit of a damage detector shown in FIG. 1.

FIG. 6 is a circuit diagram showing the configuration of a wire break detecting circuit of the damage detector 106 shown in FIG. 1.

As shown in FIGS. 1 and 6, the damage detector 106 includes a pair of external connection terminals A and B, a comparator 65, a damage detection power supply 61, and a reference power supply 62. An output terminal of the comparator 65 is connected to the calculation processing portion 41 of the control device 105. A positive side input terminal of the comparator 65 is connected to the external connection terminal B, to which one end of the damage detecting wire 31 of the PEFC 101 is connected. The other end of the damage detecting wire 31 is connected to the external connection terminal A, to which a positive terminal of the damage detection power supply 61 is connected. A negative terminal of the damage detection power supply 61 is electrically grounded. Meanwhile, a negative side input terminal of the comparator 65 is connected to one end of a resistor R2, and the other end of the resistor R2 is electrically grounded. In addition, in parallel with the resistor R2, the negative side input terminal of the comparator 65 is connected to a series circuit constituted by a resistor R1 and the reference power supply 62. In the series circuit, the negative side input terminal of the comparator 65 is connected to the resistor R1, and the resistor R1 is connected to a positive terminal of the reference power supply 62. A negative terminal of the reference power supply 62 is electrically grounded. The voltage of the damage detection power supply 61 and the voltage of the reference power supply 62 are set such that a voltage obtained by dividing the voltage of the reference power supply 62 by the resistors R1 and R2 is lower than the voltage of the damage detection power supply 61. Herein, each of the voltage of the damage detection power supply 61 and the voltage of the reference power supply 62 is 12V, and the voltage obtained by dividing the voltage of 12V of the reference power supply 62 by the resistors R1 and R2 is 10V. Further, an output signal power supply 63 is connected to a positive side of the comparator 65 as a power supply for an output signal, and a negative side of the comparator 65 is electrically grounded.

With this, when the damage detecting wire 31 is in the electrical conduction state, the voltage of 12V of the damage detection power supply 61 is input to the positive side input terminal of the comparator 65, and the voltage of 10V is input to the negative side input terminal of the comparator 65. As a result, a HIGH signal, that is, 12V is output from the output terminal of the comparator 65, and this output is input to the calculation processing portion 41 of the control device 105. Meanwhile, when the damage detecting wire 31 is broken, the voltage of the damage detection power supply 61 is not input to the positive side input terminal of the comparator 65, so that the voltage input to the comparator 65 is 0V. As a result, a LOW signal, that is 0V is output from the output terminal of the comparator 65, and this output is input to the calculation processing portion 41 of the control device 105. The calculation processing portion 41 of the control device 105 detects the LOW signal of the comparator 65, thereby detecting the break of the damage detecting wire 31.

Even if the damage detecting wire 31 is not broken but is damaged to be almost broken, a resistance value of the damage detecting wire 31 increases. In this case, the voltage input to the positive side input terminal of the comparator 65 decreases from 12V. Here, the relation between a voltage $V_B$ of the positive side input terminal of the comparator 65 and an output signal voltage $V_O$ will be explained in reference to FIG. 19.

Figure 19:
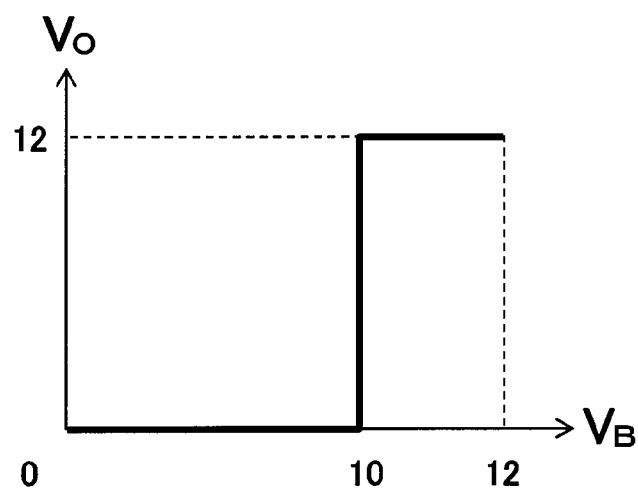
FIG. 19 is a graph showing an output signal voltage $V_O$ with respect to a voltage $V_B$ of a positive side input terminal of a comparator shown in FIG. 6.

FIG. 19 is a graph showing the relation between the voltage $V_B$ of the positive side input terminal of the comparator 65 and the output signal voltage $V_O$.

As shown in FIG. 19, when the voltage $V_B$ is 10V or higher, the voltage $V_O$ becomes the HIGH signal. Thus, the control device 105 detects that the damage detecting wire 31 is in the electrical conduction state. On the other hand, when the voltage $V_B$ is lower than 10V, the voltage $V_O$ becomes the LOW signal. Thus, the control device 105 detects that the damage detecting wire 31 is broken, and the fuel cell stack 100 is damaged. Therefore, even if the damage detecting wire 31 is not completely broken, it is possible to detect that the damage detecting wire 31 is almost broken.

In the foregoing, each of the voltage of the damage detection power supply 61, the voltage of the reference power supply 62, and the voltage of the output signal power supply 63 is set to 12V. However, the present embodiment is not limited to this, and each of these voltages may be set to any voltage. Moreover, herein, the voltage of 10V is input to the negative side input terminal of the comparator 65. However, the present embodiment is not limited to this, and any voltage may be input to the negative side input terminal of the comparator 65. For example, by changing the values of the resistors R1 and R2, any voltage may be input to the negative side input terminal of the comparator 65. To be specific, by suitably changing the voltage of the damage detection power supply 61 and the voltage input to the negative side input terminal of the comparator 65, any voltage may be set as the voltage indicating that the damage detecting wire 31 is almost broken. With this, it is possible to detect even a minor damage of the fuel cell stack 100.

Next, the method for forming the damage detecting wire 31 of the PEFC 101 of the fuel cell system according to Embodiment 1 will be explained. Although the separators 6A and 6B are different in shape from each other, the method for forming the damage detecting wire 31 is the same therebetween. Therefore, the method for forming the damage detecting wire 31 on the anode separator 6A will be explained herein.

First, the anode separator 6A is manufactured by forming the fuel gas channel 7, the heat medium channel 9, the manifold holes, such as the fuel gas supply manifold hole 21a, and the like by machining on the graphite plate impregnated with phenol resin (see FIG. 4).

Then, the groove 71 is formed by machining on the peripheral portion of the inner surface of the anode separator 6A on which the routing portion 31a is to be disposed. A through hole is formed so as to extend in the thickness direction from the terminal end portion of the groove 71. Then, the groove 71 is further formed on the outer surface of the separator 6A to extend in the horizontal direction from the through hole.

Next, the electrically nonconductive material, such as fluorocarbon rubber, is printed by a screen mesh or an auto dispenser in the groove 71 formed on the inner and outer surfaces of the anode separator 6A, and a wire formed by covering the electrically conductive wire 72 made of the electrically conductive material with the insulator 73 made of the electrically nonconductive material is embedded in the through hole formed on the separator 6A. Then, the electrically conductive material, such as carbon paste, is printed so as to be connected to the electrically conductive wire 72, thereby allowing the current to flow therethrough. Then, the electrically nonconductive material is printed so as to cover the electrically conductive material and be flush with the main surface of the separator 6A. Then, at a portion where the first connection portion 31b is to be formed, a ring-shaped electrically nonconductive material having a hole of about 1 mm at its center is printed so as not to completely cover the wire formed by printing the electrically conductive material. The height of the ring-shaped electrically nonconductive material in the thickness direction is set to be equal to the sum of the height of the gaskets 10 or the MEA 5 in the thickness direction and the depth of the terminal end portion 81 of the second connection portion 31c of the anode separator 6A in the thickness direction in the state where the fuel cell stack 100 is fastened. Then, the electrically conductive material is filled in and printed in the center hole of the ring-shaped electrically nonconductive material. Thus, the first connection portion 31b is formed. With this, the damage detecting wire 31 is formed, and the electrically conductive wire 72 of the damage detecting wire 31 is insulated from the separator 6A by the insulator 73.

Next, the operation of the fuel cell system according to Embodiment 1 will be explained. Since a normal operation of the fuel cell system is known, an explanation thereof is omitted. Herein, only an operation of detecting the damage of the fuel cell stack 100 will be explained.

In FIGS. 1 and 6, the voltage of the damage detection power supply 61 of the damage detector 106 is applied to the damage detecting wire 31 of the PEFC 101. When the fuel cell stack 100 of the PEFC 101 is not broken, the damage detecting wire 31 is in the electrical conduction state. On this account, a positive voltage is input from the damage detector 106 to the calculation processing portion 41 of the control device 105. Therefore, the calculation processing portion 41 does not detect the break of the damage detecting wire 31.

On the other hand, when the fuel cell stack 100 of the PEFC 101 is damaged, the damage detecting wire 31 is broken, so that a negative voltage is input from the damage detector 106 to the calculation processing portion 41 of the control device 105. With this, the calculation processing portion 41 detects the break of the damage detecting wire 31, and therefore, the calculation processing portion 41 detects the damage of the fuel cell stack 100. Then, the calculation processing portion 41 causes the display portion 43 to display a message regarding the damage of the fuel cell stack 100.

In this case, since the damage detecting wire 31 is disposed to substantially extend along the peripheral portion of the individual separator constituting the fuel cell stack 100, it breaks even when the minor damage of the individual separator occurs. Therefore, it is possible to detect the minor damage of the individual separator, that is, the minor damage of the fuel cell stack 100. In addition, it is possible to simplify the configuration since the configuration is realized only by forming the damage detecting wire 31 on the fuel cell stack 100 and disposing the damage detector 106. Moreover, the electrical conduction of the open circuit can be detected not only while the power generating operation is being carried out but also while it is not being carried out. Therefore, it is also possible to detect, for example, the damage caused when transporting the fuel cell or the damage caused due to freezing occurred while the power generating operation is not being carried out.

Next, Modification Example of the fuel cell system according to Embodiment 1 will be explained.

Modification Example 1

Figure 7:
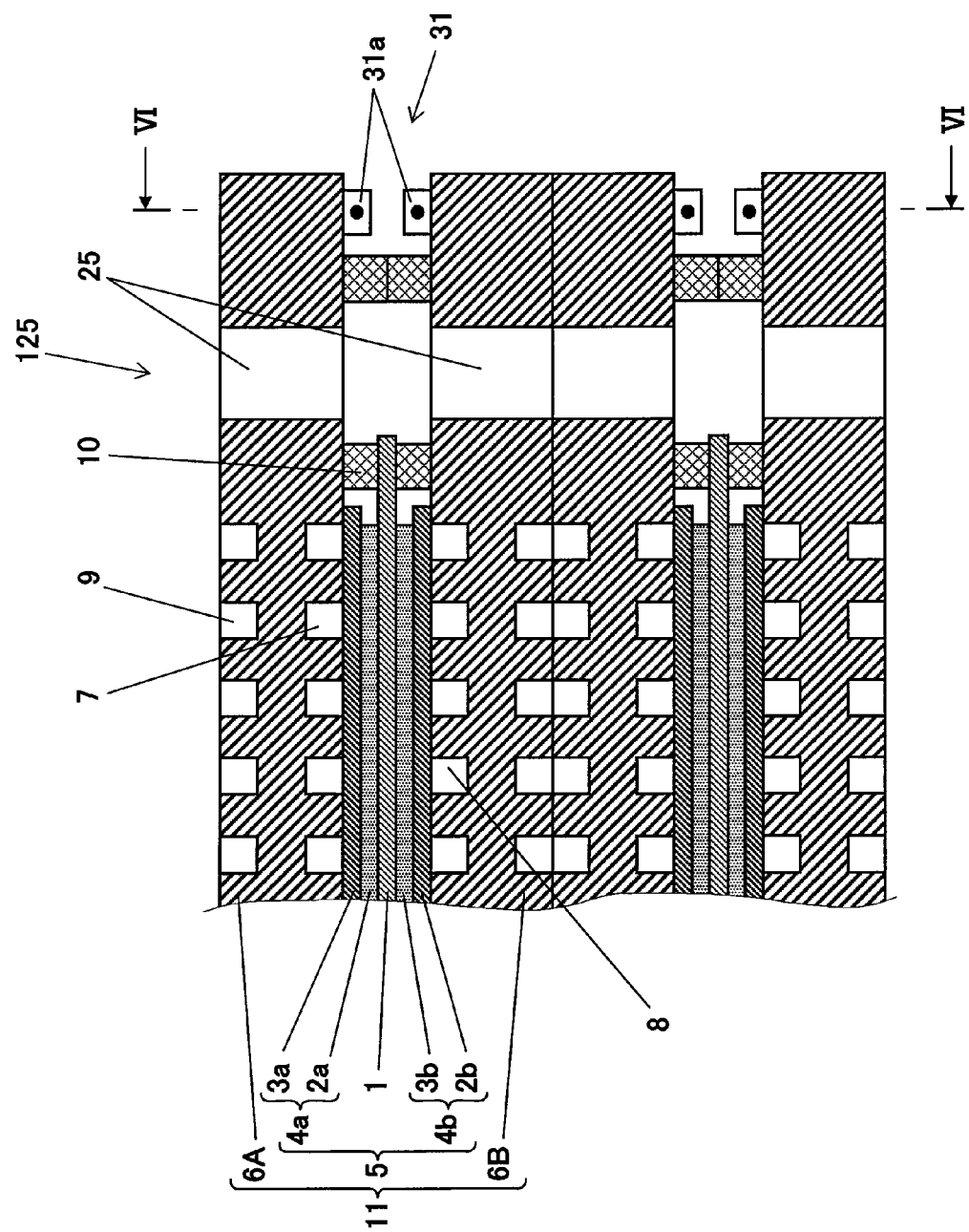
FIG. 7 is a schematic diagram showing the configuration of the cell in Modification Example of the fuel cell system according to Embodiment 1.
Figure 8:
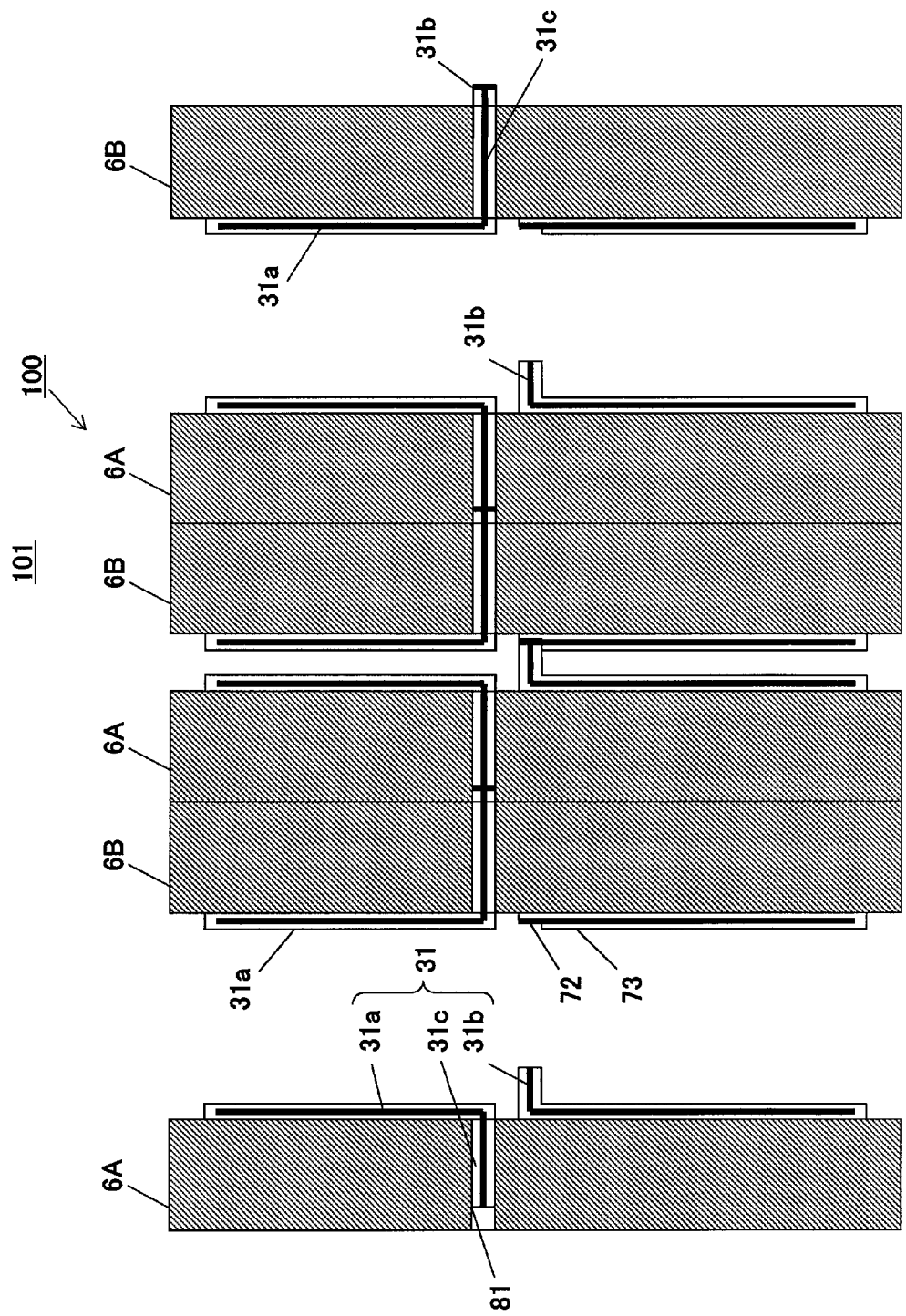
FIG. 8 is a cross-sectional view showing a cross section taken along line VI-VI of FIG. 7.

FIG. 7 is a schematic diagram showing the configuration of the cell 11 in Modification Example 1. FIG. 8 is a cross-sectional view showing a cross section taken along line VI-VI of FIG. 7. In FIGS. 7 and 8, a part of the cell 11 is omitted. In the following explanation, same reference numbers are used for the same or corresponding portions as in FIG. 3, and a repetition of the same explanation is avoided.

The fuel cell system of Modification Example 1 and the fuel cell system according to Embodiment 1 are the same in the basic configuration as each other. However, the damage detecting wire 31 disposed in the fuel cell stack 100 is different therebetween as follows.

As shown in FIG. 7, the routing portion 31a of the damage detecting wire 31 is formed on the inner surfaces of the anode separator 6A and the cathode separator 6B so as to project from the inner surfaces of the anode separator 6A and the cathode separator 6B.

Moreover, as shown in FIG. 8, the first connection portion 31b is not formed at the start end portion of the routing portion 31a disposed on the cathode separator 6B, and the second connection portion 31c is formed such that the terminal end portion 81 thereof projects in the thickness direction. At the start end portion of the routing portion 31a, the electrically conductive wire 72 is covered with the insulator 73 so as to be insulated from the cathode separator 6B, but is not covered with the insulator 73 so as to be connected to (contact with) the electrically conductive wire 72 of the first connection portion 31b of the anode separator 6A.

Then, the start end portion of the routing portion 31a disposed on the anode separator 6A and the terminal end portion 81 of the second connection portion 31c are formed so as not to coincide with (overlap with) each other when viewed from the thickness direction of the separator, and the start end portion of the routing portion 31a disposed on the cathode separator 6B and the terminal end portion 81 of the second connection portion 31c are formed so as not to coincide with (overlap with) each other when viewed from the thickness direction of the separator.

However, the first connection portion 31b disposed on the anode separator 6A and the start end portion of the routing portion 31a disposed on the cathode separator 6B are formed to contact with each other, and the terminal end portion 81 of the second connection portion 31c disposed on the anode separator 6A and the first connection portion 31b of the cathode separator 6B are formed to contact with each other.

With this, in the state where the fuel cell stack 100 is fastened, the damage detecting wires 31 disposed on the separators 6A and 6B are connected to one another to form one open circuit in the entire fuel cell.

As above, since it is unnecessary to form the grooves on the separators 6A and 6B in Modification Example 1, this simplifies the manufacturing of the fuel cell system.

Herein, the fuel cell system is configured such that the first connection portion 31b is formed on the anode separator 6A but is not formed on the cathode separator 6B. However, the present invention is not limited to this. The fuel cell system may be configured such that the first connection portion 31b is not formed on the anode separator 6A but formed on the cathode separator 6B.

Embodiment 2

The fuel cell system according to Embodiment 2 of the present invention and the fuel cell system according to Embodiment 1 are the same in the basic configuration as each other, but are different from each other as below.

Figure 9:
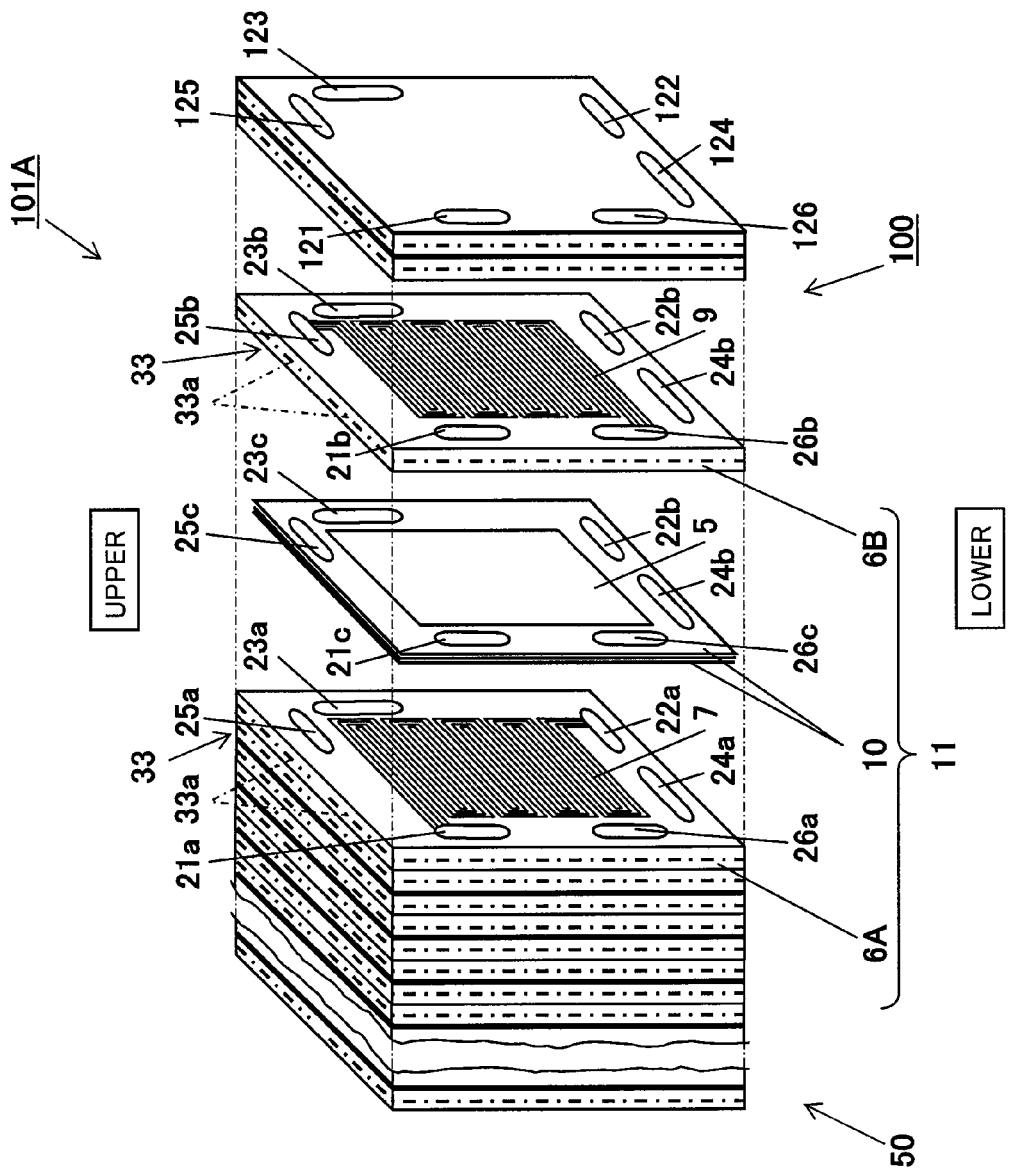
FIG. 9 is a developed view schematically showing the polymer electrolyte fuel cell of the fuel cell system according to Embodiment 2.

FIG. 9 is a developed view schematically showing a PEFC 101A of the fuel cell system according to Embodiment 2. Note that a vertical direction in FIG. 9 is defined as shown in the drawing. In the following explanation, same reference numerals are used for the same or corresponding portions as in FIG. 2, and a repetition of the same explanation is avoided.

Figure 10:
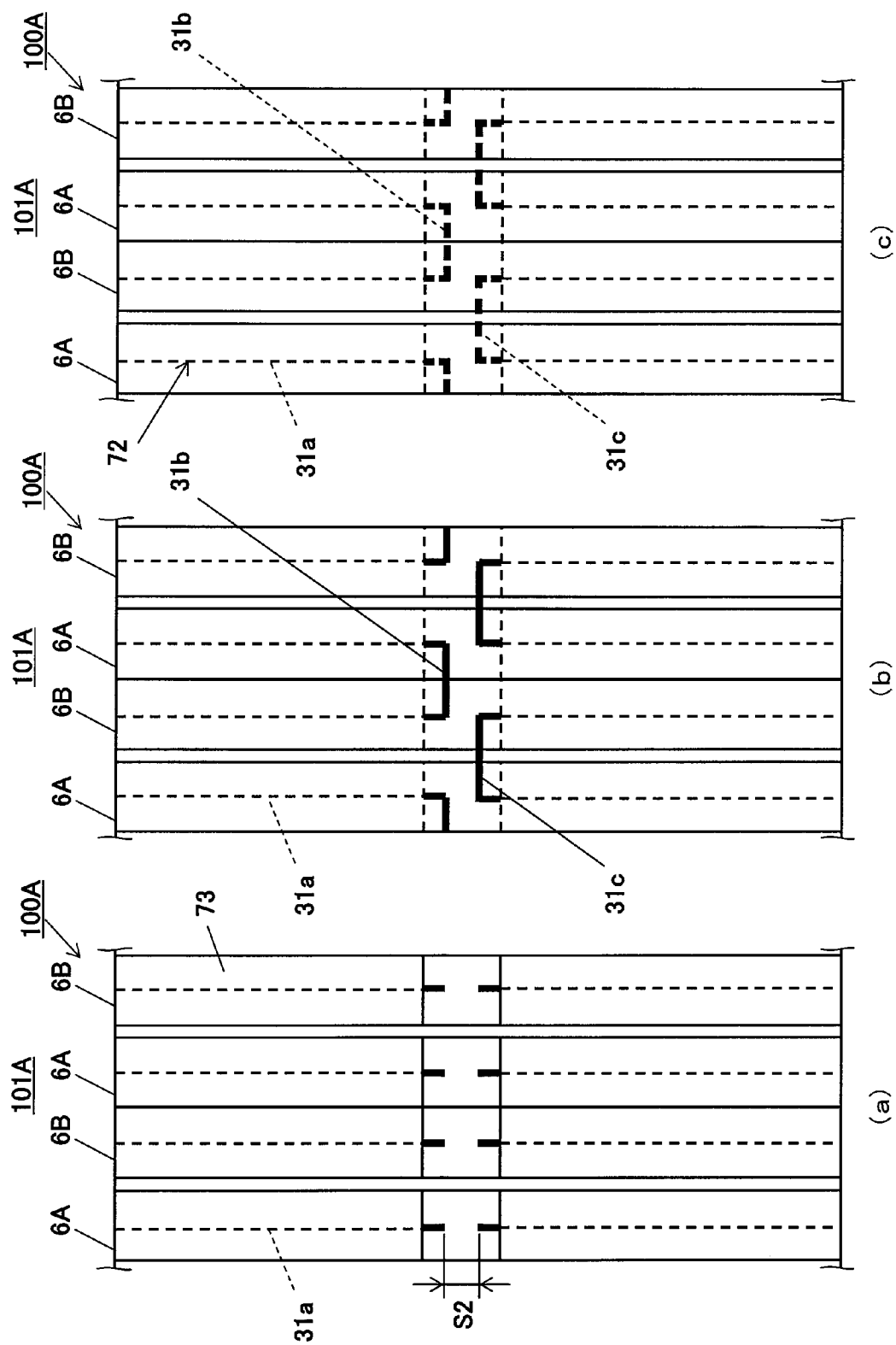
FIG. 10 are schematic diagrams each showing a method for forming a damage detecting wire of the polymer electrolyte fuel cell shown in FIG. 9.

As shown in FIG. 9, in the PEFC 101A of the fuel cell system according to Embodiment 2, the routing portion 31a constituting the damage detecting wire 31 is disposed to extend along a side surface (outer peripheral portion) of each of the separators 6A and 6B substantially once. Then, the first connection portion 31b connects the start end portion of the routing portion 31a of the anode separator 6A and the start end portion of the routing portion 31a of the cathode separator 6B, and the second connection portion 31c connects the terminal end portion of the routing portion 31a of the anode separator 6A and the terminal end portion of the routing portion 31a of the cathode separator 6B (see FIG. 10).

With this, the damage detecting wires 31 disposed on the separators 6A and 6B are connected to one another to form one open circuit in the entire fuel cell.

Next, the method for forming the damage detecting wire 31 will be explained.

FIGS. 10(a) to 10(c) are schematic diagrams each showing the method for forming the damage detecting wire 31 of the PEFC 101A shown in FIG. 9.

First, in a step shown in FIG. 10(a), the insulator 73 made of the electrically nonconductive material, such as fluorocarbon rubber, is printed on a side surface of each of the separators 6A and 6B which are not stacked on each other yet. Then, the electrically conductive wire 72 made of the electrically conductive material, such carbon paste, is printed so as to be routed along the side surface of each of the separators 6A and 6B. At this time, the electrically conductive wire 72 is printed such that a space S2 is formed at a substantially center of one side surface of each of the separators 6A and 6B. Further, the insulator 73 is printed to cover the electrically conductive wire 72 such that a part of the electrically conductive wire 72 is exposed. The separators 6A and 6B formed as above are stacked on and fastened to each other. Thus, the fuel cell stack 100A is manufactured.

Next, as shown in FIG. 10(b), in the fuel cell stack 100A, the electrically conductive material is printed on the outer peripheral surface of the fuel cell stack 100A so as to connect exposed portions of the electrically conductive wires 72 formed between adjacent separators. Specifically, the electrically conductive material is printed to connect the start end portion of the routing portion 31a of the anode separator 6A and the start end portion of the routing portion 31a of the cathode separator 6B, and the electrically conductive material is printed to connect the terminal end portion of the routing portion 31a of the anode separator 6A and the terminal end portion of the routing portion 31a of the cathode separator 6B.

As shown in FIG. 10(c), the insulator 73 is printed to cover the exposed portion of the electrically conductive wire 72.

With this, the damage detecting wire 31 is formed, and the electrically conductive wire 72 of the damage detecting wire 31 is insulated from the fuel cell stack 100A by the insulator 73. Thus, one open circuit is formed in the entire fuel cell.

Herein, the routing portion 31a is formed in advance on each of the separators 6A and 6B, and then the fuel cell stack 100A is fastened. However, the present embodiment is not limited to this. The routing portion 31a may be formed after the fuel cell stack 100A is manufactured. Moreover, herein, the first connection portion 31b and the second connection portion 31c are formed by directly printing the electrically conductive wire 72 on the fuel cell stack 100A. However, the present embodiment is not limited to this. Each of the first connection portion 31b and the second connection portion 31c may be formed by printing the electrically conductive material on a film made of the electrically nonconductive material, and the adjacent routing portions 31a may be connected to each other by this film.

As above, since the damage detecting wire 31 is formed to substantially extend along the side surface of the individual separator constituting the fuel cell stack 100A in the fuel cell system according to Embodiment 2, the same effect as in Embodiment 1 can be obtained.

Embodiment 3

The fuel cell system according to Embodiment 3 of the present invention and the fuel cell system according to Embodiment 1 are the same in the basic configuration as each other, but are different from each other in that a plurality of open circuits (two open circuits in the present embodiment) are formed by dividing the connection of the damage detecting wire.

First, the configuration of the damage detecting wire disposed on the anode separator will be explained.

Figure 11:
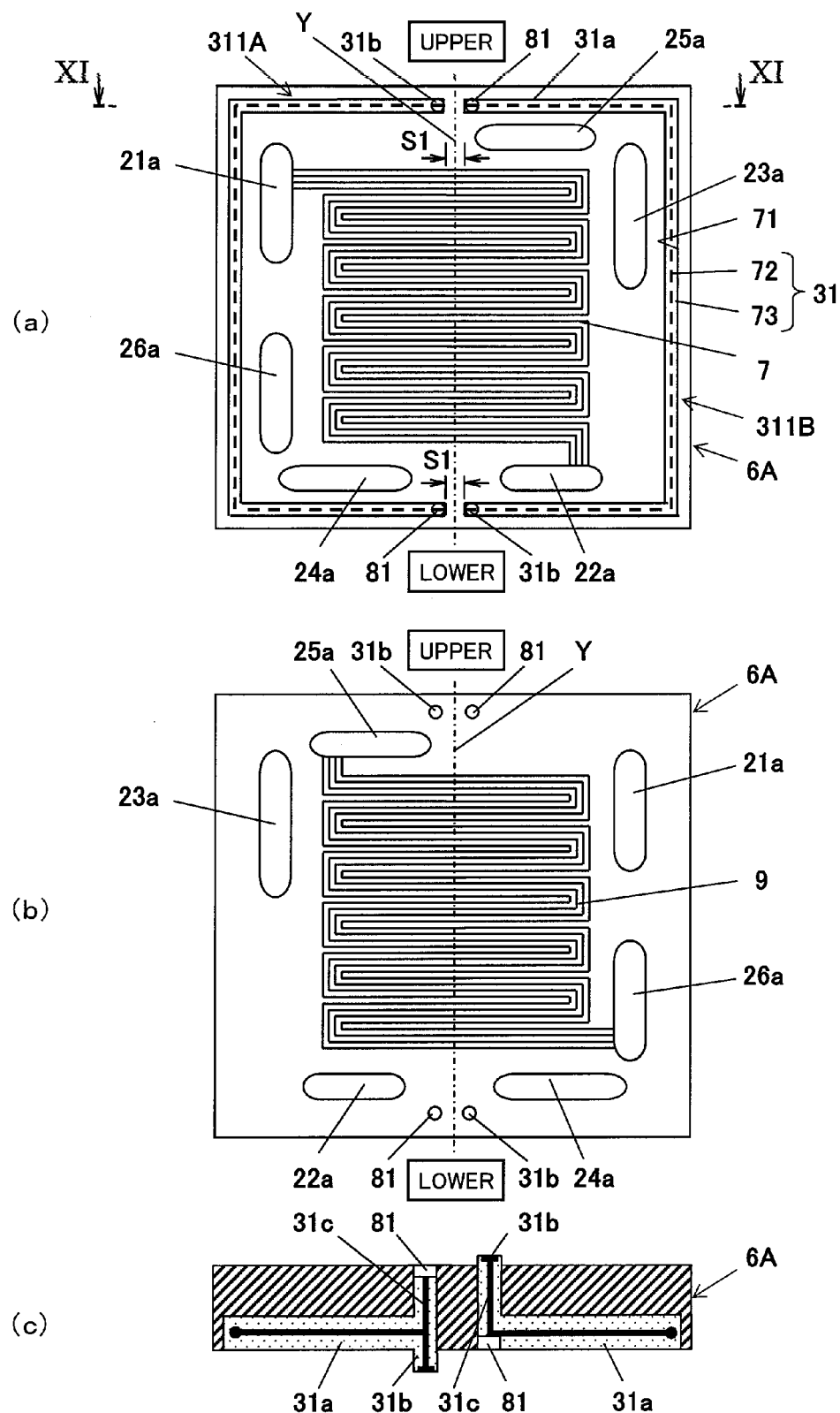
FIG. 11 are schematic diagrams each showing the configuration of the anode separator of the fuel cell in the fuel cell system according to Embodiment 3.

FIG. 11 are schematic diagrams each showing the configuration of the anode separator of the fuel cell in the fuel cell system according to Embodiment 3. FIG. 11(a) is a schematic diagram showing the configuration of the inner surface of the anode separator 6A. FIG. 11(b) is a schematic diagram showing the configuration of the outer surface of the anode separator 6A. FIG. 11(c) is a cross-sectional view showing a cross section taken along line XI-XI of FIG. 11(a). Note that a vertical direction in each of FIGS. 11(a) and 11(b) is defined as shown in the drawing. In the following explanation, same reference numbers are used for the same or corresponding portions as in FIG. 4, and a repetition of the same explanation is avoided.

As shown in FIGS. 11(a) to 11(c), the damage detecting wires 31 are separately disposed on the anode separator 6A. To be specific, two damage detecting wires 31 are disposed on the inner surface of the anode separator 6A so as to be substantially symmetric about an axis Y. Hereinafter, the damage detecting wire which surrounds the fuel gas supply manifold hole 21a, the heat medium discharge manifold hole 26a, and the oxidizing gas discharge manifold hole 24a is referred to as a first damage detecting wire 311A, and the damage detecting wire which surrounds the heat medium supply manifold hole 25a, the oxidizing gas supply manifold hole 23a, and the fuel gas discharge manifold hole 22a is referred to as a second damage detecting wire 311B.

The routing portion 31a of the first damage detecting wire 311A is formed on the inner surface of the anode separator 6A so as to substantially extend halfway along the peripheral portion (outer peripheral portion) of the inner surface of the anode separator 6A counterclockwise. Meanwhile, the routing portion 31a of the second damage detecting wire 311A is formed to substantially extend halfway along the peripheral portion clockwise.

Moreover, the first connection portion 31b is formed at the start end portion of the routing portion 31a of the first damage detecting wire 311A, which portion is located at an upper portion of the anode separator 6A, so as to project from the inner surface of the anode separator 6A, and the second connection portion 31c is embedded inside the start end portion. The start end portion of the first connection portion 31b and the terminal end portion 81 of the second connection portion 31c are formed to coincide with each other in a front view. Meanwhile, the first connection portion 31b is formed at the terminal end portion of the routing portion 31a of the first damage detecting wire 311A so as to project from the outer surface of the anode separator 6A, and the second connection portion 31c is embedded inside the start end portion. Similarly, the first and second connection portions 31b and 31c are formed at the start end portion of the second damage detecting wire 311A which portion is located at a lower portion of the anode separator 6A, and the first and second connection portions 31b and 31c are also formed at the terminal end portion thereof.

As with the anode separator 6A, the damage detecting wire 31 is also disposed on the cathode separator 6B. Since the damage detecting wire 31 is formed on the cathode separator 6B in the same manner as the anode separator 6A, a detailed explanation thereof is omitted. Moreover, the height of the first connection portion 31b in the thickness direction which is formed to project from the inner surface of the anode separator 6A or the cathode separator 6B is set to be equal to the sum of the height of the gaskets 10 or the MEA 5 in the thickness direction and the depth of the terminal end portion 81 of the second connection portion 31c of the anode separator 6A in the thickness direction in the state where the fuel cell stack 100 is fastened. Moreover, the height of the first connection portion 31b in the thickness direction which is formed to project from the outer surface of the anode separator 6A or the cathode separator 6B is set to be equal to the depth of the terminal end portion 81 of the second connection portion 31c in the thickness direction.

With this, in the state where the fuel cell stack 100 is fastened, the first connection portion 31b of the anode separator 6A fits in the terminal end portion 81 of the second connection portion 31c of the cathode separator 6B, and the first connection portion 31b of the cathode separator 6B fits in the terminal end portion 81 of the second connection portion 31c of the anode separator 6A. Thus, the first and second damage detecting wires 311A and 311A of the separators 6A and 6B are connected to one another. Thus, two open circuits are formed in the entire fuel cell. In the present embodiment, the damage detecting wires 31 are formed on the inner surface of the anode separator 6A. However, the present embodiment is not limited to this. The damage detecting wires 31 may be formed on the outer surface of the anode separator 6A. Moreover, one of two damage detecting wires 31 may be formed on the inner surface of the anode separator 6A, and the other damage detecting wire 31 may be formed on the outer surface of the anode separator 6A. In the present embodiment, two damage detecting wires 31 are formed. However, the present embodiment is not limited to this. Two or more damage detecting wires 31 may be formed.

Next, the configuration of the damage detector of the fuel cell system according to Embodiment 3 will be explained in reference to FIG. 12.

Figure 12:
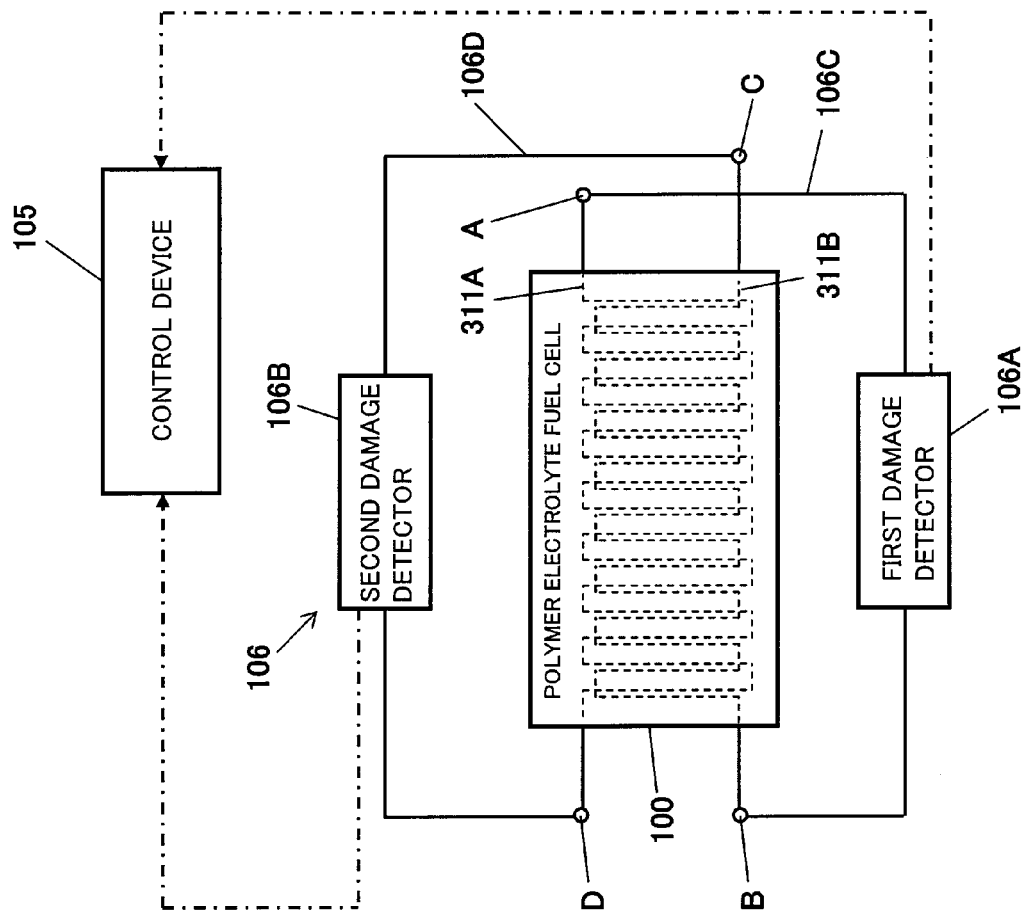
FIG. 12 is a schematic diagram showing the configuration of the damage detector of the fuel cell system according to Embodiment 3.

FIG. 12 is a schematic diagram showing the configuration of the damage detector of the fuel cell system according to Embodiment 3. In the following explanation, same reference numbers are used for the same or corresponding portions as in FIG. 6, and a repetition of the same explanation is avoided.

As shown in FIG. 12, the fuel cell system according to Embodiment 3 includes a first damage detector 106A and a second damage detector 106B, each of which is constituted by the damage detector 106 of Embodiment 1.

Specifically, one end of the first damage detecting wire 311A of the PEFC 101 is connected to the external connection terminal A, and the other end of the first damage detecting wire 311A is connected to the external connection terminal B. The external connection terminal A and the external connection terminal B are connected to each other by an electric wire 106C, and the first damage detector 106A is disposed on a portion of the electric wire 106C. Similarly, one end of the second damage detecting wire 311B of the PEFC 101 is connected to an external connection terminal C, and the other end of the second damage detecting wire 311A is connected to an external connection terminal D. The external connection terminal C and the external connection terminal D are connected to each other by an electric wiring 106D, and the second damage detector 106B is disposed on a portion of the electric wiring 106D.

With this, the damage of the fuel cell stack 100 can be detected as with Embodiment 1. Moreover, in the present embodiment, since a plurality of the damage detecting wires 31 are formed on the fuel cell stack 100, it is possible to easily specify the damaged portion.

In the present embodiment, two damage detecting wires 31 are formed on each of the separators 6A and 6B. However, the present embodiment is not limited to this. A plurality of the damage detecting wires 31 (for example, three or more damage detecting wires 31) may be formed. Further, the damage detectors are disposed on two open circuits, respectively. However, the present embodiment is not limited to this. Two open circuits may be connected to each other in series, and the resistance value may be detected by one damage detector.

Next, Modification Example of the fuel cell system according to Embodiment 3 will be explained.

Modification Example 2

The PEFC 101 of the fuel cell system of Modification Example 2 and the PEFC 101 of the fuel cell system of Embodiment 1 are the same in the basic configuration as each other. However, they are different from each other in that when manufacturing the fuel cell stack 100 by stacking the cells 11, the damage detecting wires 31 formed on the separators 6A and 6B are connected to one another so as to be divided into a plurality of (herein, two) groups in the stack direction of the cells, thereby forming a plurality of open circuits.

Figure 13:
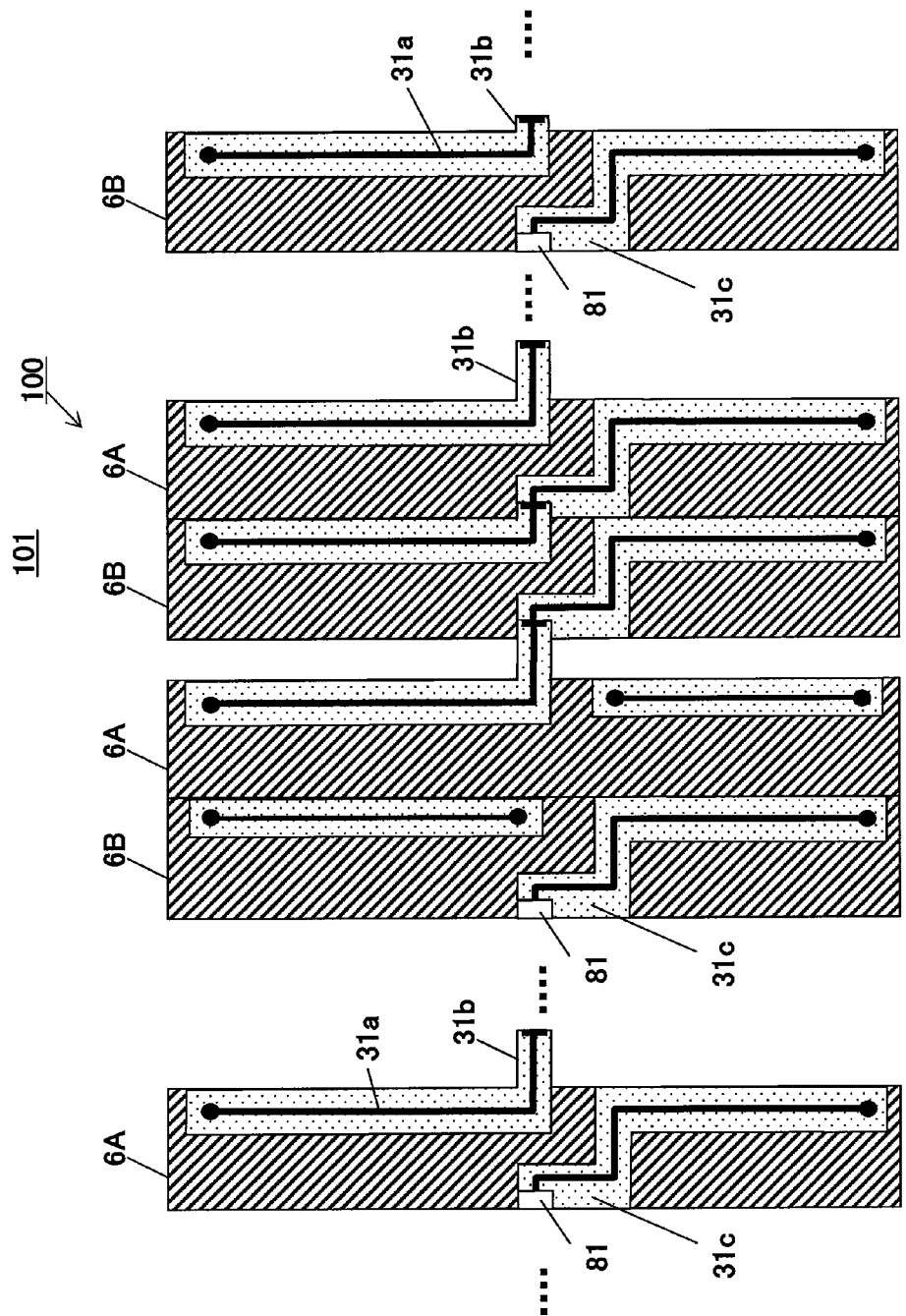
FIG. 13 is a cross-sectional view schematically showing the configuration of the polymer electrolyte fuel cell of the fuel cell system in Modification Example.

FIG. 13 is a cross-sectional view schematically showing the configuration of the PEFC 101 of the fuel cell system of the present modification example. In FIG. 13, a part of the PEFC 101 is omitted. In the following explanation, same reference numbers are used for the same or corresponding portions as in FIG. 5, and a repetition of the same explanation is avoided.

As shown in FIG. 13, in Modification Example 2, the damage detecting wires 31 of adjacent cells 11 which are located at a predetermined portion of the fuel cell stack 100 in the stack direction are formed so as not to be connected to each other. Specifically, the first connection portion 31b is not formed at the terminal end portion of the routing portion 31a of the damage detecting wire 31 of the cathode separator 6B of one of the adjacent cells 11, and the damage detecting wire 31 extends to the outside of the fuel cell stack 100. In addition, the second connection portion 31c is not formed at the terminal end portion of the routing portion 31a of the damage detecting wire 31 of the anode separator 6A of the other the cell 11, and the damage detecting wire 31 extends to the outside of the fuel cell stack 100. With this, when manufacturing the fuel cell stack 100 by stacking the cells 11, the damage detecting wires 31 are divided into two groups in the stack direction of the cells and are connected to one another for each group to form two open circuits.

Then, as with the fuel cell system according to Embodiment 1, the damage detector (not shown) is disposed to detect the resistance value of the damage detecting wire 31 forming the open circuit. With this, it is possible to detect the damage of the fuel cell stack 100. In addition, since a plurality of the damage detecting wires 31 are formed in the fuel cell stack 100, it is possible to easily specify the damaged portion.

Herein, the damage detecting wires 31 are divided into two groups and are connected to one another for each group to form two open circuits. However, the present modification example is not limited to this, and a plurality of (for example, three or more, and not more than the number of cells stacked) the damage detecting wires 31 may be formed. Further, herein, the damage detectors are formed in two open circuits, respectively. However, the present modification example is not limited to this. Two open circuits may be connected to each other in series, and the resistance value may be detected by one damage detector.

Embodiment 4

The fuel cell system according to Embodiment 4 of the present invention and the fuel cell system according to Embodiment 1 are the same in the basic configuration as each other. However, they are different from each other in that the damage detecting wire is formed inside each separator.

Figure 14:
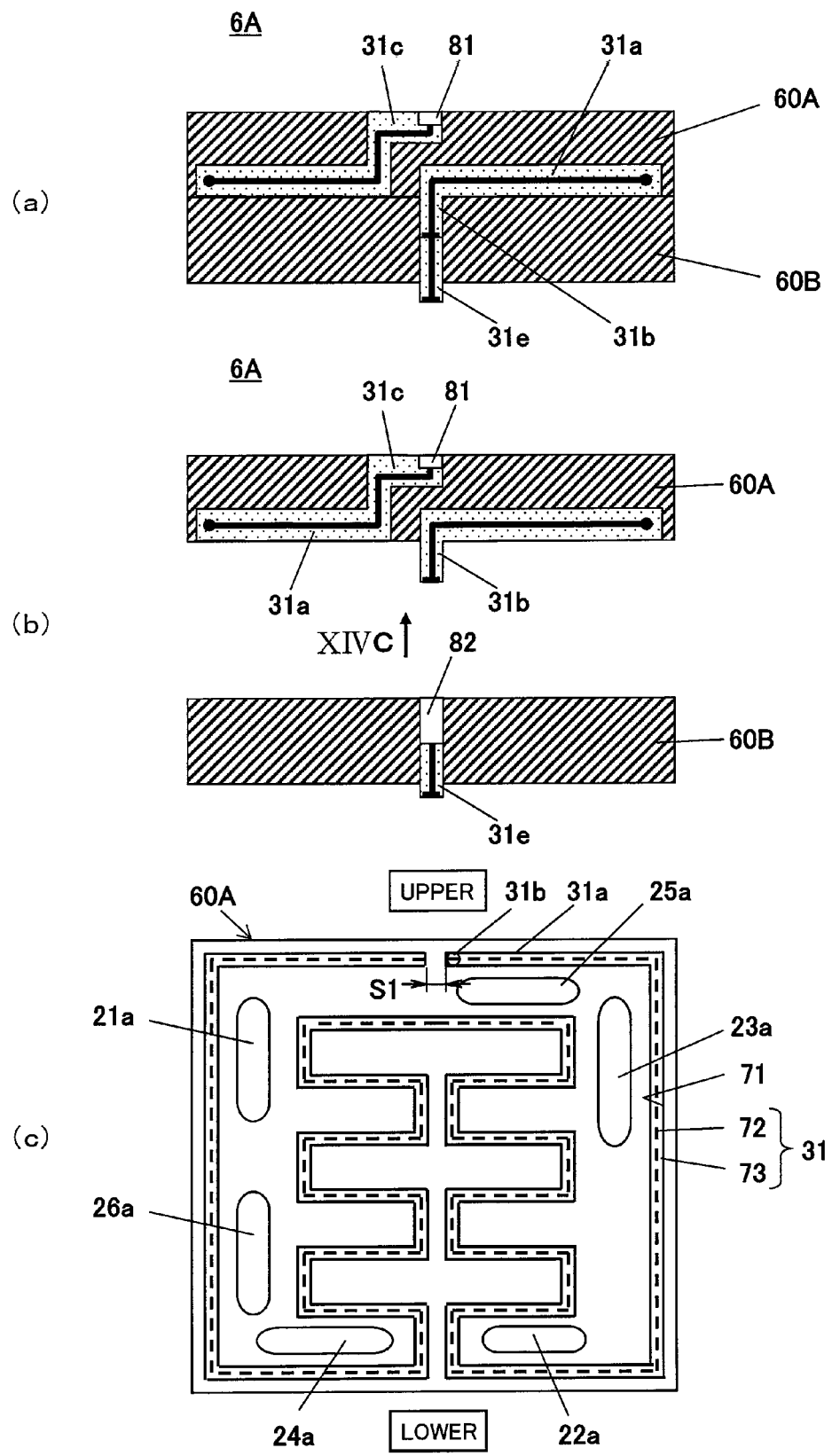
FIG. 14 are schematic diagrams each showing the configuration of the anode separator of the fuel cell system according to Embodiment 4.

FIG. 14 are schematic diagrams each showing the configuration of the anode separator 6A of the fuel cell system according to Embodiment 4. FIG. 14(*a*) is a cross-sectional view of the anode separator 6A. FIG. 14(*b*) is an exploded cross-sectional view of the anode separator 6A shown in FIG. 14(*a*). FIG. 14(*c*) is a schematic diagram showing the anode separator 6A when viewed from a XIVC direction of FIG. 14(*b*). In FIG. 14(*c*), a vertical direction of the anode separator 6A is defined as the vertical direction of the drawing. In the following explanation, same reference numbers are used for the same or corresponding portions as in FIG. 4, and a repetition of the same explanation is avoided.

As shown in FIGS. 14(*a*) to 14(*c*), the anode separator 6A of the fuel cell system according to Embodiment 4 includes two plate members 60A and 60B and is formed by joining these plate members 60A and 60B. On one main surface (hereinafter referred to as "inner surface") of the plate member 60A which surface contacts the plate member 60B, the damage detecting wire 31 is formed to extend in a surface direction of the anode separator 6A (to be precise, the plate member 60A).

Specifically, the damage detecting wire 31 formed on the inner surface of the plate member 60A includes the routing portion 31a and a serpentine portion 31d, and the routing portion 31a and the serpentine portion 31d are formed so as not to short-circuit. The start end portion and the terminal end portion of the routing portion 31a are located at a substantially center portion of an upper edge portion on the inner surface of the plate member 60A, and the routing portion 31a is formed to extend along the peripheral portion of the plate member 60A. Meanwhile, the serpentine portion 31d is formed in a region (region located on an inner side of respective manifold holes) located on an inner side of the peripheral portion of the plate member 60A so as to have a serpentine shape. Moreover, the first connection portion 31b is formed at the start end portion of the routing portion 31a of the damage detecting wire 31 so as to project from the inner surface of the plate member 60A, and the second connection portion 31c is formed at the terminal end portion of the routing portion 31a of the damage detecting wire 31.

On one main surface of the plate member 60B which surface contacts the plate member 60A, a third connection portion 31e is formed at a portion which contacts the first connection portion 31b. A start end portion 82 of the third connection portion 31e is concave in the thickness direction, and a terminal end portion thereof projects in the thickness direction.

Then, the plate member 60A and the plate member 60B formed as above are joined to each other in a suitable manner to form the anode separator 6A. Since the cathode separator 6B is formed in the same manner as above, a detailed explanation thereof is omitted.

As above, in the fuel cell system according to Embodiment 4, the damage detecting wire 31 is formed not only at the peripheral portions of the separators 6A and 6B but also the inner regions thereof (the damage detecting wire 31 is formed in the entire region of each of the separators 6A and 6B in the surface direction). Therefore, it is possible to detect the damage occurred in the inner region of each of the separators 6A and 6B. Thus, it is possible to detect the further minor damage. Herein, the damage detecting wire 31 is formed in the entire region of each of the separators 6A and 6B in the surface direction. However, the present embodiment is not limited to this. The damage detecting wire 31 may be formed in any manner as long as it is formed to extend in the surface direction.

Embodiment 5

The fuel cell system according to Embodiment 5 of the present invention and the fuel cell system according to Embodiment 1 are the same in the basic configuration as each other. However, the configuration of the cell 11 is different therebetween as below.

Figure 15:
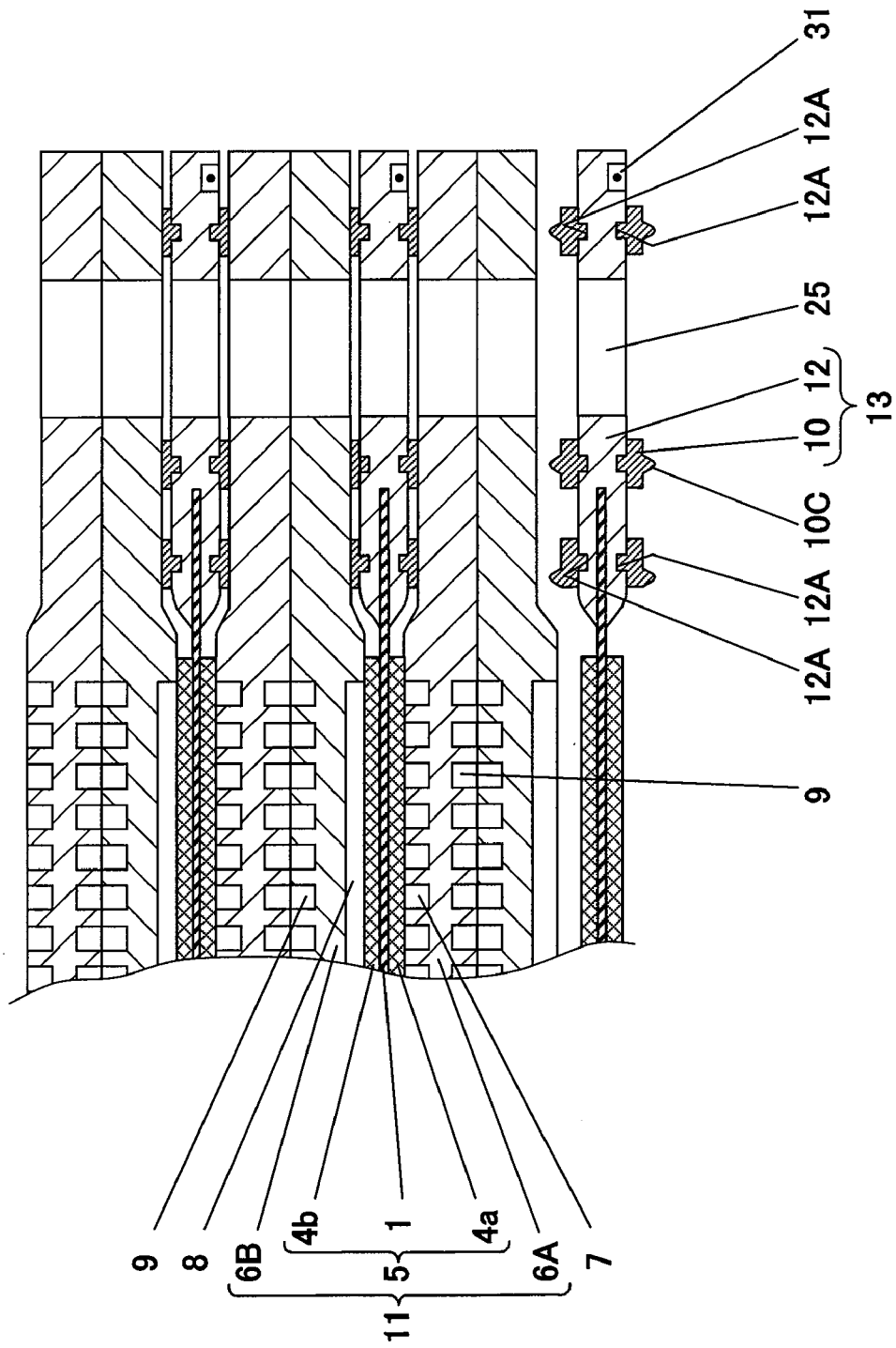
FIG. 15 is a cross-sectional view schematically showing the configuration of the cell of the polymer electrolyte fuel cell in the fuel cell system according to Embodiment 5.

FIG. 15 is a cross-sectional view schematically showing the configuration of the cell 11 of the PEFC 101 in the fuel cell system according to Embodiment 5. In FIG. 15, a part of the cell 11 is omitted, and a part of the cell 11 is developed. In the following explanation, same reference numbers are used for the same or corresponding portions as in FIG. 4, and a repetition of the same explanation is avoided.

As shown in FIG. 15, the cell 11 includes the MEA 5, a peripheral member 13 having the gasket 10 and a frame member 12, the anode separator 6A, and the cathode separator 6B. The frame member 12 is disposed to sandwich the peripheral portion of the polymer electrolyte membrane 1 of the MEA 5. Moreover, the damage detecting wire 31 is disposed at the peripheral portion of the frame member 12. Further, a center portion of the inner surface of each of the anode separator 6A and the cathode separator 6B has a step portion projecting in a trapezoid shape so as to correspond to a step formed by the difference of thickness between the frame member 12 and the MEA 5.

Here, the peripheral member 13 will be explained in further details in reference to FIGS. 16 to 18.

Figure 16:
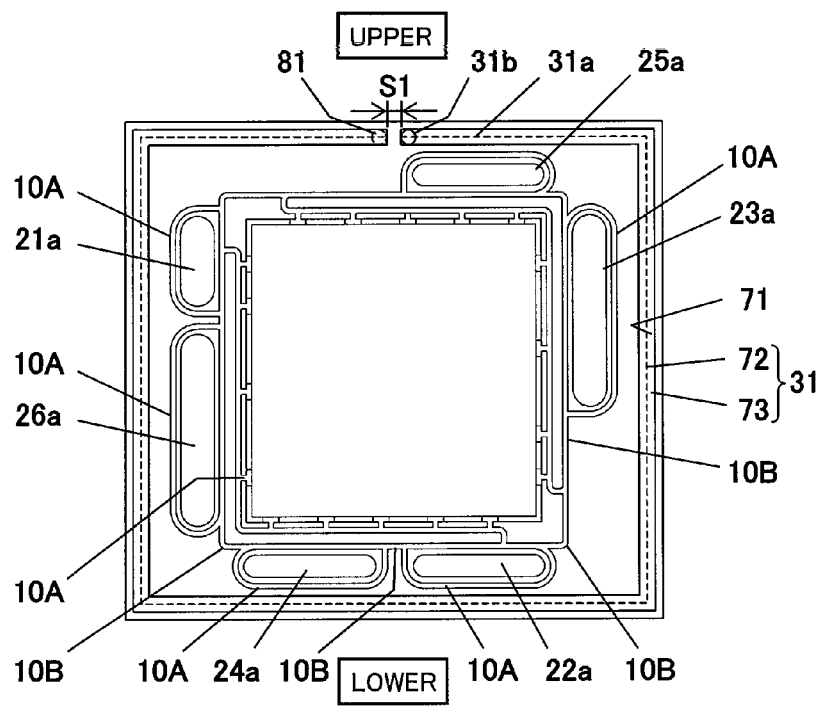
FIG. 16 is a front view schematically showing the configuration of a peripheral member of the cell shown in FIG. 15.

FIG. 16 is a front view schematically showing the configuration of the peripheral member 13 of the cell 11 shown in FIG. 15. FIG. 17 is a front view schematically showing the configuration of the peripheral member 13 of the cell 11 shown in FIG. 15. FIG. 18 is a cross-sectional view taken along line XVIII-XVIII of FIG. 16. In FIGS. 16 and 17, the vertical direction of the peripheral member 13 is defined as the vertical direction in the drawings.

First, the configuration of the peripheral member 13 will be explained.

As shown in FIGS. 15 to 18, the frame member 12 is formed in a substantially rectangular ring shape, and is joined to an outer edge of the polymer electrolyte membrane 1 of the MEA 5. An opening of the frame member 12 is formed to be slightly larger than the anode 4a or the cathode 4b of the MEA 5. Moreover, respective manifold holes, such as the fuel gas supply manifold 21a, are formed at the peripheral portion of the frame member 12.

Then, a positioning groove 10A is formed on the main surface of the frame member 12 so as to facilitate the positioning of the gasket 10. Moreover, the gasket 10 is disposed on the main surface of the frame member 12.

The gasket 10 is made of an elastic body, and includes annular portions 10A and 10B, and a rib portion 10C. As shown in FIG. 16, the annular portion 10A is formed to surround the manifold holes, such as the fuel gas supply manifold hole 21a, and the annular portion 10B is formed to surround the opening of the frame member 12. The annular portions 10A and 10B are connected to each other. Moreover, as shown in FIG. 15, on the main surface of each of the annular portions 10A and 10B which surface is opposed to the anode separator 6A (or the cathode separator 6B), the rib portion 10C is formed to extend along an outer periphery of each of the annular portions 10A and 10B (Note that the rib portion 10C is not shown in FIG. 16.). Since the pressing force concentrates on the rib portion 10C when fastening the fuel cell stack 100, the rib portion 10C can appropriately seal the peripheries of the manifold holes and the MEA 5.

Next, respective components of the peripheral member 13 will be explained.

The frame member 12 is made of thermoplastic resin. At a temperature equal to or lower than the operating temperature of the PEFC 101, the thermoplastic resin is chemically clean and stable, and has a moderate elastic modulus and a comparatively high deflection temperature under load. Moreover, in light of chemical stability, the frame member 12 is preferably made of crystalline resin not noncrystalline resin. Among the crystalline resin, resin having high mechanical strength and high heat resistance is preferable. For example, so-called a super engineering plastic grade is preferable. Preferable examples are polyphenylene sulfide (PPS), polyether ether ketone (PEEK), liquid crystal polymer (LCP), and polyether nitrile (PEN), since each of these has a compressive elastic modulus of several thousand MPa to several tens of thousand MPa and the deflection temperature under load of 150° C. or higher. Moreover, a general-purpose resin material, such as glass fiber filled polypropylene (GEPP), is a preferable material since it has the elastic modulus which is several times higher than the elastic modulus of polypropylene (compressive elastic modulus of 1,000 to 1,500 MPa) which is not filled with the glass fiber, and has the deflection temperature under load of about 150° C. Used in the present embodiment is glass fiber added PPS (DIC-PPS FZ1140-B2 produced by DIC Corporation) that is the thermoplastic resin.

The gasket 10 is made of at least one selected from the group consisting of the thermoplastic resin and the thermoplastic elastomer. At a temperature equal to or lower than the operating temperature of the PEFC 101, each of thermoplastic resin and the thermoplastic elastomer is chemically stable and has resistance to hot water. For example, especially, each of thermoplastic resin and the thermoplastic elastomer does not cause hydrolysis. Moreover, it is desirable that the compressive elastic modulus of the gasket 10 be, for example, 200 MPa or lower. Used in the present embodiment as the preferable material is Santoprene 8101-55 (produced by Advanced Elastomer System) that is a polyolefin-based thermoplastic elastomer containing PP and EPDM.

Next, the damage detecting wire 31 will be explained.

In the present embodiment, the damage detecting wire 31 is disposed between the outer edge of the frame member 12 and each manifold hole. Specifically, the routing portion 31a of the damage detecting wire 31 is disposed to substantially extend along once the peripheral portion (outer peripheral portion) of a surface (hereinafter referred to as "outer surface") of the frame member 12 which surface is opposed to the anode separator 6A, and the manifold holes (to be precise, the gasket 10) are surrounded by the routing portion 31a. Herein, the routing portion 31a is routed counterclockwise in a front view such that the space S1 is formed at a substantially center of the upper edge portion on the outer surface of the frame member 12. The first connection portion 31b is disposed at a portion (hereinafter referred to as "start end portion") of the routing portion 31a which portion is located on one side of the space S1, and the second connection portion 31c is disposed at a portion (hereinafter referred to as "terminal end portion") of the routing portion 31a which portion is located on the other side of the space S1. Note that the outer peripheral portion of the frame member 12 denotes a region between the outer periphery of the frame member 12 and the manifold holes in a front view.

Figure 17:
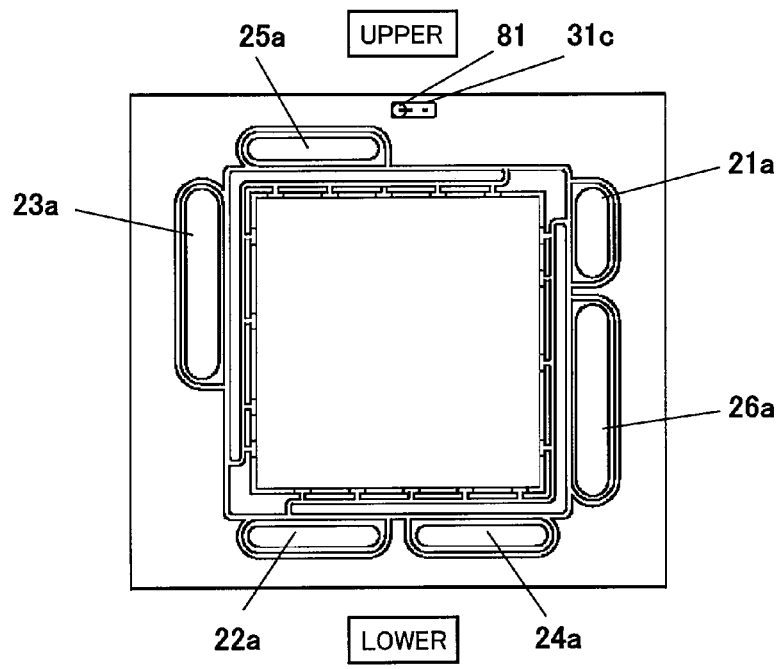
FIG. 17 is a front view schematically showing the configuration of the peripheral member of the cell shown in FIG. 15.
Figure 18:
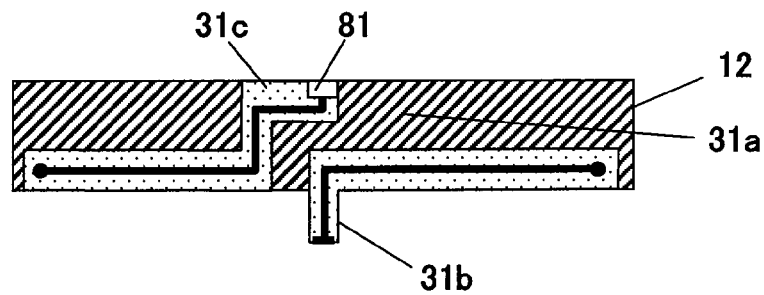
FIG. 18 is a cross-sectional view taken along line XVIII-XVIII of FIG. 16.

Moreover, as shown in FIGS. 17 and 18, the second connection portion 31c is formed to extend from the terminal end portion of the routing portion 31a up to the inner surface of the frame member 12 in the thickness direction, and further extend in a horizontal direction therefrom. The terminal end portion 81 of the second connection portion 31c is formed to coincide with (overlap with) the first connection portion 31b when viewed from the thickness direction of the frame member 12.

As shown in FIG. 18, the first connection portion 31b projects in the thickness direction, and the second connection portion 31c is concave in the thickness direction. The first connection portion 31b of the frame member 12 is formed to fit in the terminal end portion 81 of the second connection portion 31c of the adjacent frame member 12. Herein, the first connection portion 31b is disposed at an upper portion of the frame member 12. However, the present embodiment is not limited to this. The first connection portion 31b may be disposed anywhere as long as it coincides with the terminal end portion 81 of the second connection portion 31c when viewed from the thickness direction of the frame member 12, and is disposed at the peripheral portion of the frame member 12.

Herein, the damage detecting wire 31 is constituted by the electrically conductive wire 72 and the insulator 73 which covers the electrically conductive wire 72. Specifically, the first connection portion 31b is formed such that the electrically conductive wire 72 extends through the center portion of the insulator 73 having a column shape. Moreover, the routing portion 31a is formed such that the electrically conductive wire 72 covered with the insulator 73 is embedded in the groove 71 formed on the outer surface of the frame member 12. The second connection portion 31c is formed such that the electrically conductive wire 72 covered with the insulator 73 is embedded in the groove and through hole formed on the frame member 12.

Note that a through hole extending in the thickness direction is formed at a portion, at which the first connection portion 31b is formed, of each of the anode separator 6A and the cathode separator 6B, and the first connection portion 31b is formed to be fittingly inserted into this through hole. Moreover, the height of the first connection portion 31b disposed on the frame member 12 in the thickness direction is set to be equal to the sum of the height of the MEA 5 or the anode separator 6A (or the cathode separator 6B) in the thickness direction and the depth of the terminal end portion 81 of the second connection portion 31c disposed on the frame member 12 in the thickness direction in the state where the fuel cell stack 100 is fastened.

With this, in the state where the fuel cell stack 100 is fastened, the first connection portion 31b of the frame member 12 fits in the terminal end portion 81 of the second connection portion 31c of the adjacent frame member 12. Thus, the damage detecting wires 31 disposed on the frame members 12 are connected to each other. Thus, one coil-like open circuit is formed in the entire fuel cell.

As above, the damage detecting wire 31 is formed to surround the manifold holes of the frame member 12 and is formed such that the first connection portion 31b and the second connection portion 31c are connected to both ends, respectively, of the routing portion 31a disposed to substantially extend along once the peripheral portion of one main surface. The entire damage detecting wire 31 is formed to extend along the outer peripheral portions of the frame members 12 (herein, once) without short-circuiting.

As described above, the outer peripheral portion of the fuel cell stack 100 which portion is exposed to the outside is easily damaged. However, in the present embodiment, the damage detecting wire 31 is disposed to extend along such outer peripheral portion for each frame member 12.

Therefore, in a case where the separator is damaged, especially, the peripheral portion of the separator is damaged (for example, in a case where a portion between the outer periphery of the separator and the manifold hole cracks), the damage detecting wire 31 also breaks, is compressed, or the like, thereby increasing the resistance value. The damage of the fuel cell stack 100 can be detected by detecting this increased resistance value.

In the present embodiment, the damage detecting wire 31 is configured to extend along the outer peripheral portions of the frame members 12 without short-circuiting, and to extend along the outer peripheral portion of each frame member 12 once. However, the present embodiment is not limited to this. The damage detecting wire 31 may be configured to extend along the outer peripheral portion of the frame member 12 several times, or the damage detecting wire 31 may be configured not to completely extend along the outer periphery of the frame member 12 once.

Moreover, the routing portion 31a disposed on the main surface of the frame member 12 is formed to be routed counterclockwise when viewed from the thickness direction of the frame member 12. However, the present embodiment is not limited to this. The routing portion 31a disposed on the main surface of the frame member 12 may be formed to be routed clockwise. Further, as in Embodiment 3 and Modification Example 2, the damage detecting wires 31 may be divided into a plurality of groups and may be connected to one another for each group to form a plurality of open circuits. Moreover, as in Embodiment 4, the damage detecting wire 31 may be formed inside the frame member 12.

Further, in the present embodiment, the polymer electrolyte fuel cell was explained. However, the present embodiment is not limited to this. The fuel cell according to the present invention may be a phosphoric-acid fuel cell, or the like.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

Industrial Applicability

The polymer electrolyte fuel cell of the present invention is useful as a domestic cogeneration fuel cell or an in-vehicle fuel cell, which is capable of detecting the damage of the fuel cell stack without providing an excessive additional device.

Moreover, the fuel cell system of the present invention is useful as a fuel cell system which is easy in maintenance since the damage of the fuel cell stack can be detected by electrical conduction.

The invention claimed is:
1. A fuel cell system comprising:
a fuel cell including:
a plurality of cells, each of which includes: an electrolyte layer-electrode stack assembly having an electrolyte layer and a pair of gas diffusion electrodes sandwiching a portion of the electrolyte layer, which portion is located on an inner side of a peripheral portion of the electrolyte layer;

an annular peripheral member disposed at the peripheral portion of the electrolyte a pair of electrically conductive plate-shaped separators which sandwich the electrolyte layer-electrode stack assembly and the peripheral member and each of which has a main surface contacting the gas diffusion electrode and having a gas channel groove through which a reactant gas flows; and damage detecting wires; and a fuel cell stack formed by stacking the cells, wherein:

the peripheral member is constituted by an annular frame member and a sealing member or by a gasket, the frame member surrounding the electrolyte layer;

the damage detecting wires are formed at at least one of the frame member and the separators constituting the cell; and the damage detecting wires are connected to one another to form an open circuit by stacking the cells;

a damage detector configured to detect an increase in resistance of the damage detecting wires; and a control device, wherein the control device detects damage of the separator of the fuel cell stack based on the increase in the resistance of the damage detecting wires which are detected by the damage detector.

2. The fuel cell system according to claim 1, wherein the damage detecting wires are formed to extend in a surface direction of the separator.

3. The fuel cell system according to claim 2, wherein the damage detecting wires are formed to extend along an outer peripheral portion of the separator without short-circuiting.

4. The fuel cell system according to claim 2, wherein the damage detecting wires are formed in a serpentine pattern on a surface of the separator.

5. The fuel cell system according to claim 3, wherein the damage detecting wires are formed at a peripheral portion of the main surface of the separator, which surface contacts the electrolyte layer-electrode stack assembly.

6. The fuel cell system according to claim 4, wherein the damage detecting wires are formed to be flush with the main surface of the separator.

7. The fuel cell system according to claim 3, wherein the damage detecting wires are formed on a side surface of the separator.

8. The fuel cell system according to claim 2, wherein the damage detecting wires are formed inside the separator.

9. The fuel cell system according to claim 1, wherein:

the peripheral member is constituted by the annular frame member which surrounds the electrolyte layer, and the sealing member; and the damage detecting wires are formed to extend along the frame member.

10. The fuel cell system according to claim 9, wherein the damage detecting wires are formed to extend along an outer peripheral portion of the frame member without short-circuiting.

11. The fuel cell system according to claim 9, wherein the damage detecting wires are formed inside the frame member.

12. The fuel cell system according to claim 1, wherein the damage detecting wires are formed by printing.

13. The fuel cell system according to claim 1, wherein the damage detecting wires are divided into a plurality of groups in a stack direction of the cells and are connected to one another so that each group forms a plurality of the open circuits.

14. The fuel cell system according to claim 1, wherein:

the damage detecting wires are formed at a plurality of predetermined portions of the cell; and the damage detecting wires formed at the plurality of predetermined portions of the cells are connected to one another to form a plurality of the open circuits.

* * * * *